(12) United States Patent
Tomita

(10) Patent No.: US 7,933,093 B2
(45) Date of Patent: Apr. 26, 2011

(54) SPINDLE MOTOR, AND RECORDING AND REPRODUCING APPARATUS EQUIPPED WITH THE SAME

(75) Inventor: Eiji Tomita, Ehime (JP)

(73) Assignee: Panasonic Corporation, Osaka (JP)

( * ) Notice: Subject to any disclaimer, the term of this patent is extended or adjusted under 35 U.S.C. 154(b) by 648 days.

(21) Appl. No.: 12/038,317

(22) Filed: Feb. 27, 2008

(65) Prior Publication Data

US 2008/0218894 A1    Sep. 11, 2008

(30) Foreign Application Priority Data

Feb. 28, 2007    (JP) ................ 2007-049165

(51) Int. Cl.
*G11B 17/038*    (2006.01)
(52) U.S. Cl. .................................................. 360/99.12
(58) Field of Classification Search ............... 360/99.12
See application file for complete search history.

(56) References Cited

U.S. PATENT DOCUMENTS

| | | | |
|---|---|---|---|
| 5,369,537 A | | 11/1994 | Kinoshita et al. |
| 5,486,962 A | * | 1/1996 | Boutaghou ............... 360/99.12 |
| 6,226,146 B1 | * | 5/2001 | Landess et al. ........... 360/98.08 |
| 6,414,817 B1 | * | 7/2002 | Luo et al. ................. 360/98.08 |
| 6,961,215 B2 | * | 11/2005 | Hashizume et al. ....... 360/99.12 |
| 2007/0159717 A1 | * | 7/2007 | Miyajima et al. ......... 360/99.12 |

FOREIGN PATENT DOCUMENTS

| | | |
|---|---|---|
| JP | 5-59640 | 8/1993 |
| JP | 2006-155864 | 6/2006 |

\* cited by examiner

*Primary Examiner* — Mark Blouin
(74) *Attorney, Agent, or Firm* — Wenderoth, Lind & Ponack, L.L.P.

(57) ABSTRACT

The spindle motor comprises a shaft, a rotor, and a medium-carrying surface. The rotor is disposed on the outer peripheral side of the shaft, and rotates about the shaft. The medium-carrying surface is disposed on the rotor, and carries a circular-disk-form recording medium. The recording medium is pressed and fastened to the medium-carrying surface by a clamping member. The clamping member is a member that presses the recording medium against a medium-carrying surface. The average value of the widths of the profile peaks in the mean line for the primary profile of the medium-carrying surface in the radial direction is smaller than the average value of the widths of the profile valleys.

15 Claims, 22 Drawing Sheets

SPINDLE MOTOR, AND RECORDING AND REPRODUCING APPARATUS EQUIPPED WITH THE SAME

BACKGROUND OF THE INVENTION

1. Field of the Invention

The present invention relates to a spindle motor which causes a recording medium to rotate, and a recording and reproducing apparatus equipped with the same.

2. Description of the Related Art

Spindle motors are widely used for rotation of the recording medium in recording and reproducing apparatuses such as hard disk drives (hereafter abbreviated to "HDD"). In recent years, there has been a strong demand for increased capacity in HDD, and the recording density is increasing at the rate of 60% to approximately 100% every year. Along with the increase in recording density, the degree to which the HDD heads floats has dropped to 10 nm or less. However, when the amount of floating decreases, there is an increased possibility that the head will collide with the disk. Collisions between the head and disk lead directly to crashing of the disk; accordingly, in order to achieve an increase in the recording density, it is necessary to reduce the occurrence of collisions themselves. In order to reduce the occurrence of collisions, it is necessary to carefully devise the design of the air bearing surface of the slider on which the head is mounted; furthermore, it is necessary to achieve smoothing and increased precision of the disk that is mounted on the spindle motor.

Conventionally, in spindle motors used in HDD, the disk (one example of a recording medium) is secured to the disk-carrying surface (one example of a medium-carrying surface) of a rotor hub (one example of a rotor) by a clamper having spring properties (one example of a clamping member). In this case, if the precision of the disk-carrying surface is poor, the inner peripheral part of the disk may be deformed in the shape of a cup, and the outer peripheral side may be deformed with a waviness having higher secondary, tertiary, or other harmonic components. Especially in the case of small-size disks with a size of 2.5 inches or smaller, in spite of the fact that a thin disk is used, shock resistance is required in mobile applications; accordingly, a large clamping force is necessary. As a result, especially in small-size disks, deformation caused by clamping tends to occur.

In the past, therefore, spindle motors have been known in which a spiral shape cutting trace is formed so as to cover the entire circumference of the disk-carrying surface in order to reduce the deformation that is generated in the disk (for example, see Japanese Laid-Open Patent Application No. 2006-155864). In conventional spindle motors, turning is performed on the disk-carrying surface with the roughness profile set at a value that is rougher than values previously used. In concrete terms, the maximum height of the roughness profile Rz is set in the range of 0.8 µm to 6.3 µm, and the arithmetical mean deviation of roughness profile Ra is set in the range of 0.2 µm to 1.6 µm.

Furthermore, when the disk is fastened using the clamping member, a large load is placed on the rotor hub via the disk-carrying surface; accordingly, the rotor hub may undergo elastic deformation. When the rotor hub undergoes elastic deformation, the disk-carrying surface is inclined; as a result, the disk may be warped. In order to prevent this, a spindle motor is conventionally known in which the amount of deformation of the rotor hub is predicted in advance, and the disk-carrying surface is inclined so that this amount of deformation is canceled (for example, see Japanese Laid-Open Utility Model Application No. 05-059640).

SUMMARY OF THE INVENTION

In the construction used in the abovementioned Japanese Laid-Open Patent Application No. 2006-155864, since a regular cutting trace remains following working, a carrying surface is obtained in which the amount of protrusion of the profile peak portions of the cutting trace is relatively uniform, and the profile peak portions of the disk-carrying surface that support the disk can be reduced. However, in this conventional construction, the surface texture of the disk-carrying surface is stipulated only by the maximum height and arithmetic mean deviation of roughness profile; the shapes of the profile peaks and profile valleys in the primary profile of the surface are not defined. Accordingly, the amount of deformation of the profile peak portions that occurs when the disk is mounted is unstable. As a result, especially in cases where a disk with a 2.5 inch size or smaller which has a small thickness is mounted, peak hardly deforms but only a disk may undergo elastic deformation. To go even further, even if there are few profile peaks, then if there is warping in the disk-carrying surface, and the profile peaks do not undergo elastic deformation, the disk will conform to the warping of the disk-carrying surface.

A construction in which the disk-carrying surface is inclined so that such warping of the disk-carrying surface has no effect has also been proposed in Japanese Laid-Open Utility Model Application No. 05-059640. However, the amount of slope that is actually required is a mere 1 to 2 µm between the inner circumference and outer circumference of the disk-carrying surface; if there is any departure from this range, or if there is any waviness, the warping deformation of the disk actually increases. Accordingly, in the construction described in Japanese Laid-Open Utility Model Application No. 05-059640, a sizeable effort is required when the disk-carrying surface is worked in order to maintain control operation with a high degree of lathe precision, and this also causes a drop in the yield. Furthermore, if the clamping force varies during assembly, the amount of elastic deformation of the disk-carrying surface varies; accordingly, it becomes difficult to control the warping of the disk as intended.

Furthermore, in small size HDD with a size of 2.5 inches or less, the length of the disk-carrying surface in the radial direction is a length of 1 mm or less. In the case of such a length, it is impossible to ensure the standard evaluation length used for the measurement of the roughness profile as defined in JIS B0633:2001. For example, the evaluation length required in a case where the arithmetic mean deviation of roughness profile Ra is 0.1 µm to 0.2 µm is 4 mm. Accordingly, if the disk-carrying surface is stipulated by the roughness profile, it is difficult to specify an accurate surface texture, the strength of the profile peaks that support the disk varies, and there is a danger that the support by the profile peaks will become unstable.

In concrete terms, if the sharpness of the profile peaks in the primary profile of the cross section of the disk in the radial direction fluctuates, the strength of the profile peaks varies, and there is a danger that the profile peaks will be caused to undergo deformation or not caused to undergo deformation by the disk pressed by the clamper. As a result, there is a possibility that it will not be possible to cause sufficient suppression of the deformation of the disk.

It is an object of the present invention to allow suppression of the deformation of the recording medium caused by clamping in a spindle motor having a medium-carrying surface.

The spindle motor of a first aspect of the present invention comprises a shaft, a rotor, and a medium-carrying surface. The rotor is disposed on the outer peripheral side of the shaft, and rotates about the shaft. The medium-carrying surface is disposed on the rotor, and carries a circular-disk-form recording medium. The recording medium is pressed against the medium-carrying surface, and fastened in place, by a clamping member. The clamping member is a member that presses the recording medium against the medium-carrying surface. Here, the average values of the widths of the profile peaks in the mean line for the primary profile of the medium-carrying surface in the radial direction are smaller than the average values of the widths of the profile valleys.

Here, the terms "width of the profile peak" and "width of the profile valley" will be explained with reference to FIG. 4. "Width of the profile peak" refers to the distance from rise to fall of profile peak portions that are higher than the mean line AL of the primary profile shown in FIG. 4. In the drawings, these values are expressed as $Lp1, Lp2, \ldots, Lpk$. Similarly, furthermore, "width of the profile valley" refers to the distance from fall to rise of profile valley portions that are lower than the mean line AL; in the drawings, these values are expressed as $Lv1, Lv2, \ldots, Lvk$.

In this spindle motor, when the recording medium is placed on the medium-carrying surface of the rotor, the recording medium is pressed against the medium-carrying surface and clamped by the clamping member. The clamped recording medium is supported by the profile peak portions of the medium-carrying surface. The average value of the widths of the profile peaks in the mean line for the primary profile of the medium-carrying surface in the radial direction is smaller than the average value of the widths of the profile valleys in the mean line. Accordingly, the width of the profile peaks as a whole that support the recording medium is uniformly arranged to produce narrowly pointed profile peaks, and fluctuations in the strength (rigidity) of the profile peaks can be suppressed.

Furthermore, the actual contact area in which the recording medium and medium-carrying surface make contact is reduced. As a result, even if warping or waviness of around 1 to 2 µm is generated in the medium-carrying surface, the profile peaks are caused to undergo elastic deformation by the clamping force of the clamping member, and the medium-carrying surface conforms to the recording medium. Accordingly, the recording medium tends not to undergo deformation that involves a large amount of warping or waviness, and the possibility of crashing of the head is greatly reduced.

Here, as is shown in FIG. 3, the "mean line for the primary profile" is calculated by a linear approximation using the method of least squares in the range of the length of the medium-carrying surface in the radial direction, or in more concrete terms, with the length of the portion that can be viewed as a substantially straight line excluding beveling or the like taken as the evaluation length ln (furthermore, in the case of P-parameter, this is the same as the sampling length lp); as one example, the primary profile Sc of the medium-carrying surface in the radial direction is itself taken as the evaluation length ln (sampling length lp) as shown in FIG. 5. Furthermore, portions that are higher than the mean line for the primary profile Sc are profile peaks, and portions that are lower are profile valleys.

Furthermore, the average value Lpave of the widths Lpk of the profile peaks and the average value Lvave of the widths Lvk of the profile valleys shown in FIG. 6 are respectively the average values of the widths Lpk of the profile peaks and widths Lvk of the profile valleys of the primary profile in the radial direction in the sampling length lp. Furthermore, the average value Zpave of the profile peak heights and average value Zvave of the profile valley depths described later are respectively the average values of the profile peak heights Zpk (k=1, 2, ..., n) and profile valley depths Zvk (k=1, 2, ..., m) of the primary profile in the sampling length lp. Where the numbers of profile peaks and profile valleys are respectively n and m, the abovementioned average values are expressed by the equations shown below. Here, profile peaks that are extremely small with respect to the maximum value of the profile peak height Zp (for example, around 5% or less) need not be counted in n. Similarly, profile valleys that are extremely small with respect to the maximum value of the profile valley depth Zv (for example, around 5% or less) need not be counted in m.

$$Lpave = \frac{1}{n}\sum_{k=1}^{n} Lpk$$

$$Lvave = \frac{1}{m}\sum_{k=1}^{m} Lvk$$

$$Zpave = \frac{1}{n}\sum_{k=1}^{n} Zpk$$

$$Zvave = \frac{1}{m}\sum_{k=1}^{m} Zvk$$

Here, the surface texture of the medium-carrying surface is stipulated not in terms of the roughness profile, but rather by the average values of the widths of the profile peaks and profile valleys in the mean line for the primary profile in the radial direction, and the average value of the widths of the profile peaks is set at a value that is smaller than the average value of the widths of the profile valleys. Accordingly, on the whole, the profile peaks have a narrower width than the profile valleys, and at the same time, the tip ends of the profile peaks are sharp. Consequently, elastic deformation of the profile peaks readily occurs, and fluctuations in the strength of the profile peaks can be suppressed. Accordingly, even if a waviness or slope should be generated in the medium-carrying surface, and the certain profile peak heights are higher than the other profile peak heights, the profile peaks have a small width and are sharply pointed, so that when the medium-carrying surface is pressed by the recording medium, the profile peaks undergo elastic deformation rather than the recording medium, and the waviness or slope can easily be absorbed, allowing suppression of the deformation of the recording medium caused by clamping.

The spindle motor of a second aspect of the present invention is the spindle motor of the first aspect, wherein the average value of the profile peak heights is 1.5 times the average value of the profile valley depths or greater.

Here, since the average value Zpave of the profile peak heights is 1.5 times the average value Zvave of the profile valley depths or greater, the profile peak heights on the whole are conspicuously greater than the profile valley depths, variation in the strength (rigidity) of the profile peaks is further reduced, and the profile peaks readily undergo elastic deformation. Accordingly, deformation of the recording medium can be further suppressed.

The spindle motor of a third aspect of the present invention is the spindle motor of the first aspect, wherein the average value of the widths of the profile valleys is 1.5 times the average value of the widths of the profile peaks or greater.

Here, since the average value Lpave of the widths of the profile peaks is 1.5 times the average value Lvave of the widths of the profile valleys or greater, the widths of the profile peaks on the whole is conspicuously narrower than the widths of the profile valleys, variation in the strength (rigidity) of the profile peaks is further reduced, and the profile peaks readily undergo elastic deformation. Accordingly, deformation of the recording medium can be further suppressed.

The spindle motor of a fourth aspect of the present invention comprises a shaft, a rotor, and a medium-carrying surface. The rotor is disposed on the outer peripheral side of the shaft, and rotates about the shaft. The medium-carrying surface is disposed on the rotor, and carries a circular-disk-form recording medium. The recording medium is pressed against the medium-carrying surface and fastened in place by a clamping member. The clamping member is a member that presses the recording medium against the medium-carrying surface. Here, the skewness of the primary profile of the medium-carrying surface in the radial direction is grater than 0.

In this spindle motor, when the recording medium is placed on the medium-carrying surface of the rotor, the recording medium is pressed against the medium-carrying surface and clamped by the clamping member. The clamped recording medium is supported by the profile peak portions of the medium-carrying surface. The skewness of the medium-carrying surface is greater than 0. Accordingly, the profile peaks that support the recording medium are on the whole arranged as sharp profile peaks, and fluctuations in the strength (rigidity) of the profile peaks can be suppressed.

Furthermore, the actual contact area in which the recording medium and medium-carrying surface make contact is reduced. As a result, even if warping or waviness of around 1 to 2 μm is generated in the medium-carrying surface, the profile peaks are caused to undergo elastic deformation by the clamping force of the clamping member, and the medium-carrying surface conforms to the recording medium. Accordingly, the recording medium tends not to undergo deformation that involves a large amount of warping or waviness, and the possibility of crashing of the head is greatly reduced.

The skewness Psk of the primary profile Sc is the average of the cubes of the function Z(x) of the primary profile Sc in the dimensionless sampling length lp obtained by the cubing of the root mean square deviation Pq of the primary profile as shown by the following equation in accordance with JIS B0601:2001.

$$Psk = \frac{1}{Pq^3}\left[\frac{1}{lp}\int_0^{lp} Z^3(x)dx\right]$$

Here, the root mean square deviation Pq of the primary profile Sc is expressed by the following equation.

$$Pq = \sqrt{\frac{1}{lp}\int_0^{lp} Z^2(x)dx}$$

In the primary profile Sc, as is shown in FIG. 7A, the profile height amplitude curve has a distribution shape that is biased toward the profile valleys in a primary profile similar to that of the fourth aspect in which the profile valley portions are wide with respect to the profile peaks. In this case, the skewness Psk indicates a positive value (Psk>0). As the value of the skewness Psk increases on the positive side, the profile height amplitude curve is biased toward the profile valley side, the widths of the profile peaks become narrower, and the profile peaks become sharper.

On the other hand, in cases where the profile peak portions of the primary profile Sc are flat as shown in FIG. 7B, the profile height amplitude curve is biased toward the profile peak side, and the value of the skewness Psk shows a negative value (Psk<0).

Here, since the skewness Psk of the primary profile Sc is a positive value that is greater than 0, the profile height amplitude curve is biased toward the profile valley side as described above, the width of the profile peaks is narrowed, and the profile peaks become sharper. Accordingly, the profile peaks on the whole have a narrower width than the profile valleys, and the tip ends of the profile peaks are sharply pointed. Consequently, fluctuations in the strength of the profile peaks can be suppressed. Furthermore, even if a waviness or slope should be generated in the medium-carrying surface, and the certain profile peak heights are higher than the other profile peak heights, the profile peaks have a small width, so that when the medium-carrying surface is pressed by the recording medium, the profile peaks undergo elastic deformation rather than the recording medium, and the waviness or slope can easily be absorbed, allowing suppression of the deformation of the recording medium caused by clamping.

The spindle motor of a fifth aspect of the present invention is the spindle motor of the fourth aspect, wherein the skewness is greater than 0.5.

Here, since the value of the skewness Psk is greater than 0.5, the profile peak portions become even sharper, and have a narrower width. Accordingly, variation in the strength of the profile peaks is even further reduced, and the profile peaks readily undergo elastic deformation. Accordingly, deformation of the recording medium can be even further suppressed.

The spindle motor of a sixth aspect of the present invention is the spindle motor of the first aspect, wherein the arithmetical mean deviation of the primary profile is in the range of 0.5 μm to 1.5 μm.

Here, since the arithmetical mean deviation of the primary profile is in the range of 0.5 μm to 1.5 μm, the size of the profile peaks is increased to a large size, and even if the deformation of the profile peaks is large, there is no complete crushing of the profile peaks, and this deformation can be suppressed to a value within the range of the elastic deformation. Accordingly, even if there is a waviness or slope in the medium-carrying surface, the effect on the recording medium is small. Even assuming that the deformation partially enters the range of plastic deformation, only this portion undergoes deformation; on the whole, smoothing occurs, so that problems tend not to occur.

Here, the arithmetical mean deviation Pa of the primary profile is the average value of the absolute values of the function Z(x) of the primary profile Sc in the sampling length lp as shown in the following equation in accordance with JIS B0601:2001.

$$Pa = \frac{1}{lp}\int_0^{lp}|Z(x)|dx$$

The spindle motor of a seventh aspect of the present invention is the spindle motor of the fourth aspect, wherein the arithmetical mean deviation of the primary profile is in the range of 0.5 μm to 1.5 μm.

Here, since the arithmetical mean deviation of the primary profile is in the range of 0.5 μm to 1.5 μm, the size of the profile peaks is increased to a large size; even if the deformation of the profile peaks is large, there is no complete crushing of the profile peaks, and the deformation can be suppressed within the range of the elastic deformation. Accordingly, even if there is a waviness or slope in the medium-carrying surface, the effect on the recording medium is small. Even if deformation should partially enter the range of plastic deformation, only this portion is deformed, and there is smoothing overall, so that no problems occur.

Here, the arithmetical mean deviation Pa of the primary profile is the average value of the absolute values of the function Z(x) of the primary profile Sc in the sampling length lp as shown in the following equation in accordance with JIS B0601:2001.

$$Pa = \frac{1}{lp}\int_0^{lp} |Z(x)| dx$$

The spindle motor of an eighth aspect of the present invention is the spindle motor of the first aspect, wherein the medium-carrying surface is subjected to turning using a tool bit, and the radial direction interval of the profile peaks in the medium-carrying surface resulting from turning is in the range of 0.02 mm to 0.08 mm.

Here, the length in the radial direction of the medium-carrying surface carrying a recording medium with a size of 2.5 inches or less is ordinarily around 1 mm; nevertheless, profile peaks with a narrow width can be stably formed, and the number of profile peaks can be maximized. Here, if the interval of the profile peaks drops below 0.02 mm, it becomes difficult to form profile peaks with a narrow width in a stable meaner, and if this interval exceeds 0.08 mm, the number of profile peaks used to support the recording medium becomes small for the ordinary length, and it becomes difficult to suppress deformation of the recording medium.

The spindle motor of a ninth aspect of the present invention is the spindle motor of the fourth aspect, wherein the medium-carrying surface is subjected to turning using a tool bit, and the radial direction interval of the profile peaks in the medium-carrying surface resulting from turning is in the range of 0.02 mm to 0.08 mm.

Here, the length in the radial direction of the medium-carrying surface carrying a recording medium with a size of 2.5 inches or less is ordinarily around 1 mm; nevertheless, profile peaks with a narrow width can be stably formed, and the number of profile peaks can be maximized. Here, if the interval of the profile peaks drops below 0.02 mm, it becomes difficult to form profile peaks with a narrow width in a stable meaner, and if this interval exceeds 0.08 mm, the number of profile peaks used to support the recording medium becomes small for the ordinary length, and it becomes difficult to suppress deformation of the recording medium.

The spindle motor of a tenth aspect of the present invention is the spindle motor of the first aspect of a rotating-shaft type wherein the rotor rotates together with the shaft.

Here, in the rotating-shaft type spindle motor, deformation of the recording medium can be suppressed to a maximum extent.

The spindle motor of an eleventh aspect of the present invention is the spindle motor of the fourth aspect of a rotating-shaft type wherein the rotor rotates together with the shaft.

Here, in the rotating-shaft type spindle motor, deformation of the recording medium can be suppressed to a maximum extent.

The spindle motor of a twelfth aspect of the present invention is the spindle motor of the first aspect of a stationary-shaft type wherein the shaft does not rotate.

Here, in the stationary-shaft type spindle motor, deformation of the recording medium can be suppressed to a maximum extent.

The spindle motor of a thirteenth aspect of the present invention is the spindle motor of the fourth aspect of a stationary-shaft type wherein the shaft does not rotate.

Here, in the stationary-shaft type spindle motor, deformation of the recording medium can be suppressed to a maximum extent.

The recording and reproducing apparatus of a fourteenth aspect of the present invention comprises the spindle motor of the first aspect of the present invention, and a head part which performs recording and reproduction on a recording medium carried on the medium-carrying surface.

Here, since deformation of the recording medium can be suppressed to a maximum extent, higher density recording and reproduction are possible.

The recording and reproducing apparatus of a fifteenth aspect of the present invention comprises the spindle motor of the fourth aspect, and a head part which performs recording and reproduction on a recording medium carried on the medium-carrying surface.

Here, since deformation of the recording medium can be suppressed to a maximum extent, higher density recording and reproduction are possible.

In the present invention, the surface texture of the medium-carrying surface is stipulated not by the roughness profile, but rather so that the skewness of the primary profile is grater than 0, thus causing the widths of the profile peaks in the mean line for the primary profile in the radial direction to be smaller than the widths of the profile valleys. Accordingly, on the whole, the profile peaks have narrower widths than the profile valleys, and fluctuations in the strength of the profile peaks can therefore be suppressed. Consequently, even if and the certain profile peak heights are higher than the other profile peak heights, the profile peaks have a small width and are sharply pointed, so that when the medium-carrying surface is pressed by the recording medium, the profile peaks readily undergo elastic deformation rather than the recording medium, allowing suppression of the deformation of the recording medium caused by clamping.

Accordingly, as with the conventional configuration, the structural burden of the precise and stable application of a minute slope to the disk-carrying surface is eliminated, and this can make a great contribution to an increase in the yield and a reduction of manufacturing costs.

DESCRIPTION OF THE PREFERRED EMBODIMENTS

Figure 1:
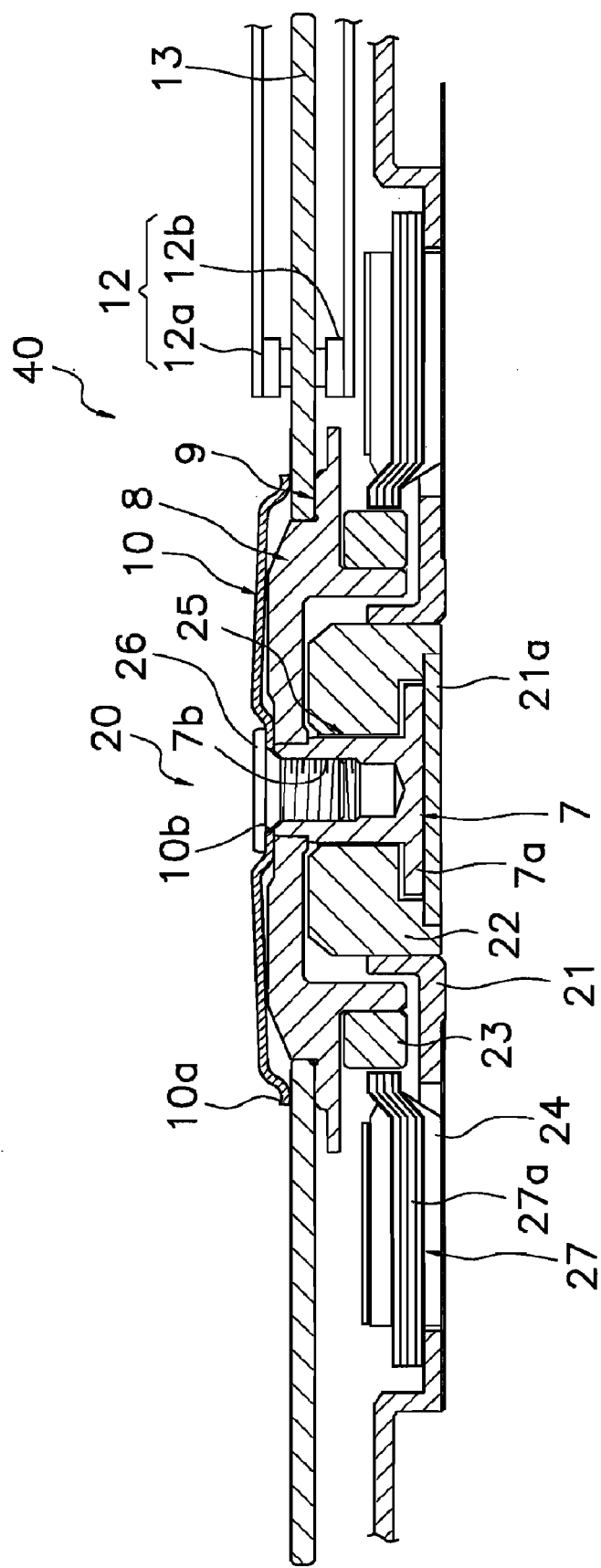
FIG. 1 is a sectional view showing the overall construction of an HDD mounting a spindle motor according to one embodiment of the present invention.

A hard disk drive (one example of a recording and reproducing apparatus, hereafter referred to as HDD) 40 on which a spindle motor 20 constituting one embodiment of the present invention is mounted will be described below with reference to FIGS. 1 and 2. Furthermore, in the following description, the vertical direction in FIG. 1 is taken as the "axial direction", the upward direction is taken as "upward in the axial direction", and the downward direction is taken as "downward in the axial direction". However, these do not stipulate the attached state of the actual spindle motor 20.

<Overall Construction of HDD 40>

Figure 2:
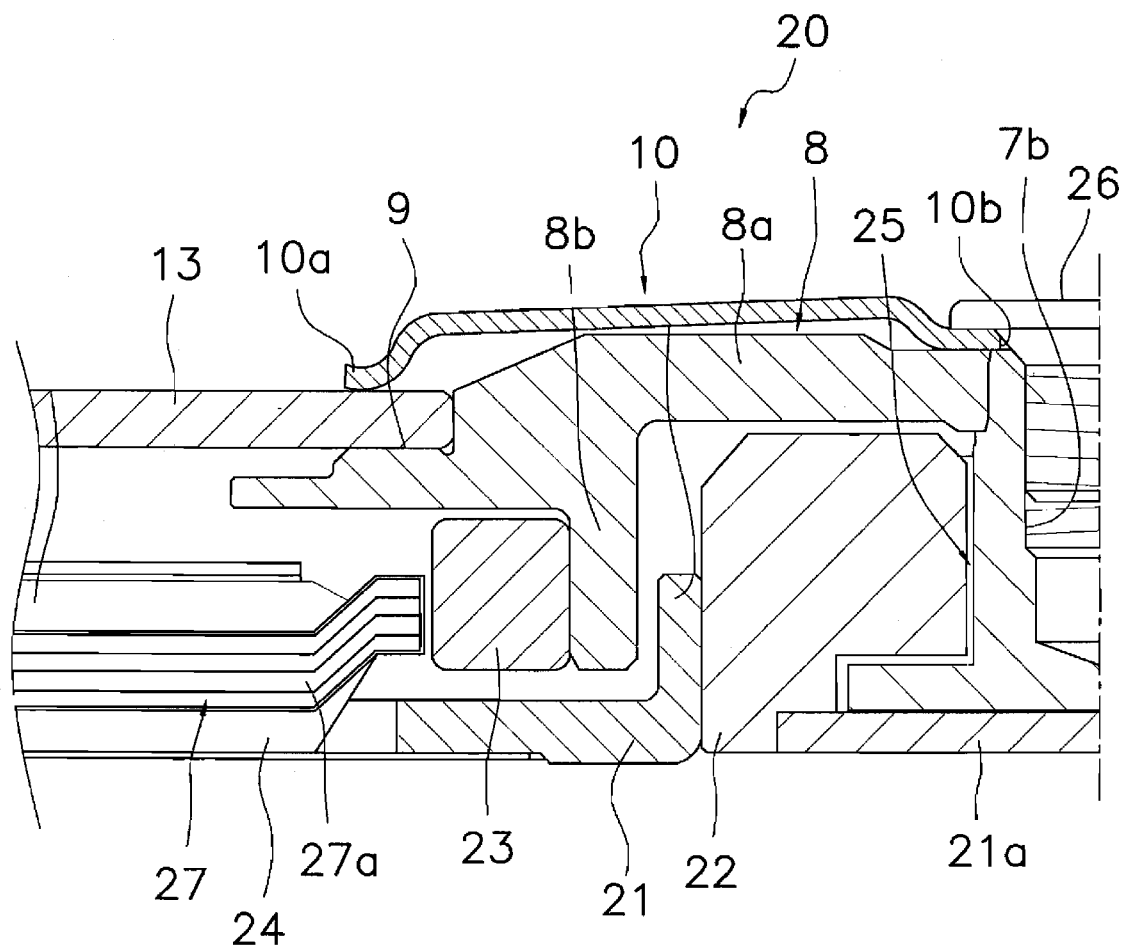
FIG. 2 is an enlarged view showing an enlargement of one portion of the HDD shown in FIG. 1.

As is shown in FIGS. 1 and 2, the HDD 40 according to one embodiment of the present invention has an internally mounted head part 12 which includes a plurality of recording and reproducing heads 12a and 12b, and a spindle motor 20. Furthermore, the respective recording and reproducing heads 12a and 12b contained in the head part 12 write information on a disk (one example of a recording medium) 13, or reproduce information that has already been written.

The head part 12 mounts two recording and reproducing heads 12a and 12b, and is disposed in close proximity to the front and back surfaces of the disk 13. The head part 12 can be caused to swing between positions facing the front and back surfaces of the disk 13 by a driving mechanism not shown in the drawings.

The disk 13 is a circular-disk-form recording medium having a diameter that allows attachment to the HDD 40, e.g., 0.5 inches, 0.85 inches, 1.8 inches, 2.5 inches, 3.5 inches, or the like. Mainly glass or aluminum subjected to electroless Ni plating to a thickness of 10 μm or greater is used as the substrate material of the disk 13. The thickness has a correlation with the disk diameter; for example, in a 0.85 inch disk, the thickness is approximately 0.25 to 0.38 mm, and in a 3.5 inch disk, the thickness is approximately 1.25 to 1.75 mm. Furthermore, the material of the disk 13 is not limited to the materials described above; synthetic resins or other metals may also be used.

<Construction of Spindle Motor 20>

The spindle motor according to one embodiment of the present invention is a device which acts as a rotary drive source for the rotary driving of the disk 13. As is shown in FIGS. 1 and 2, this spindle motor 20 comprises a shaft 7 which constitutes a rotary shaft, a rotor hub (one example of a rotor) 8 which is disposed on the outer peripheral side of the shaft 7, and which rotates about the shaft 7, and a disk-carrying surface (one example of a medium-carrying surface) 9 provided to the rotor hub 8 and carrying the disk 13. In the spindle motor 20, the disk 13 is pressed against the disk-carrying surface 9 by a clamper (one example of a clamping member) 10. Furthermore, the spindle motor 20 comprises a base 21 which supports the shaft 7 in the thrust direction, a sleeve 22 to which the base 21 is fastened, a magnet 23 which is fastened to the rotor hub 8, a coil 24 which is disposed facing the magnet 23, and a hydrodynamic bearing device 25 which is disposed between the sleeve 22 and base 21, and the shaft 7, and which supports the shaft 7 in the radial direction and thrust direction.

The shaft 7 constitutes the rotary shaft of the spindle motor 20. For example, this shaft is made of stainless steel, and has a thrust flange 7a that faces the base 21 at the lower end in the axial direction. The thrust flange 7a is integrally worked as part of the shaft 7, or is press-fitted or adhesive bonded securely to the shaft 7. For example, this flange is formed from stainless steel. A female screw hole 7b into which a screw member 26 used to fasten the clamper 10 is screwed is formed in the upper end surface of the shaft 7 in the axial direction. The rotor hub 8 is connected to the outer peripheral surface of the upper end of the shaft 7, and is able to rotate as a unit with the shaft 7.

The rotor hub 8 is formed from magnetic stainless steel having good cutting characteristics and superior resistance to out-gassing. The central part of the rotor hub 8 is fastened to the outer peripheral surface of the upper end of the shaft 7 in the axial direction by an appropriate fastening method such as press-fitting, caulking, adhesive bonding, laser welding, or the like. The rotor hub 8 has a circular-plate-form fastening part 8a which is fastened to the outer peripheral surface of the upper end of the shaft 7 in the axial direction, and a tubular magnet attachment part 8b which extends downward in the axial direction from the fastening part 8a on the outside of the sleeve 22. The disk-carrying surface 9 is integrally formed on the outside of the magnet attachment part 8b in the radial direction.

Figure 3:
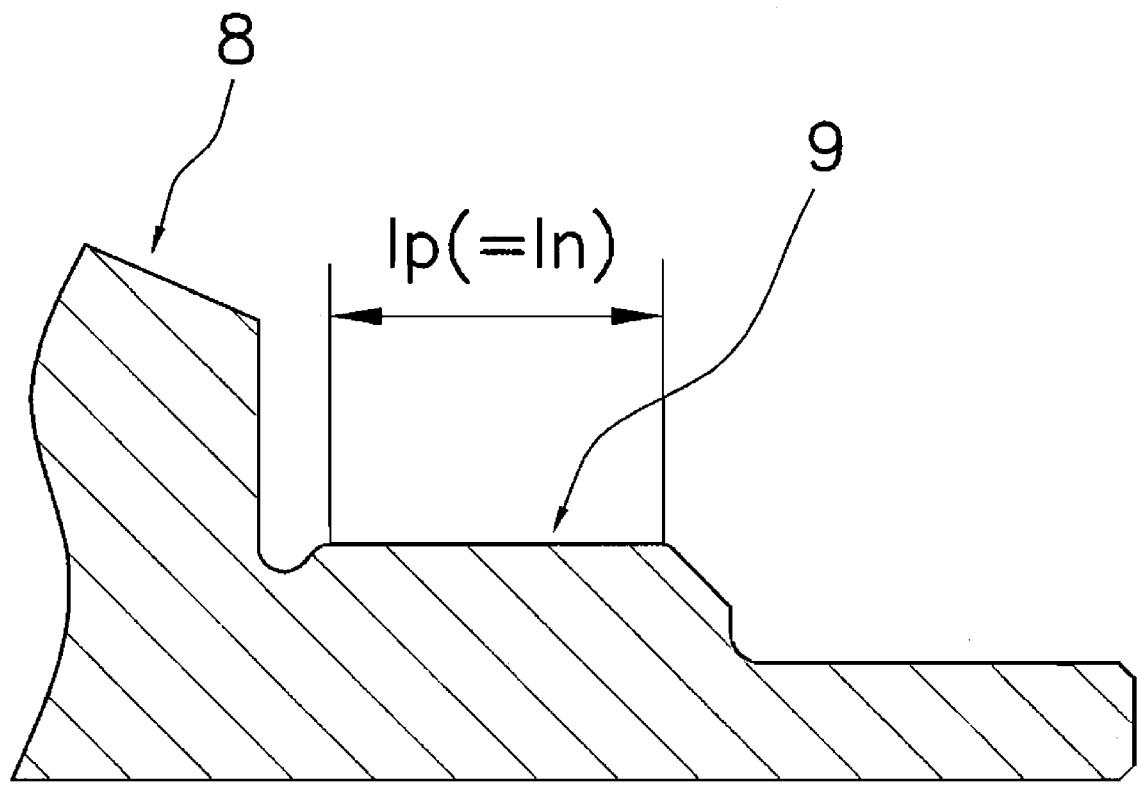
FIG. 3 is an enlarged view of the disk-carrying surface of the spindle motor shown in FIG. 1.
Figure 4:
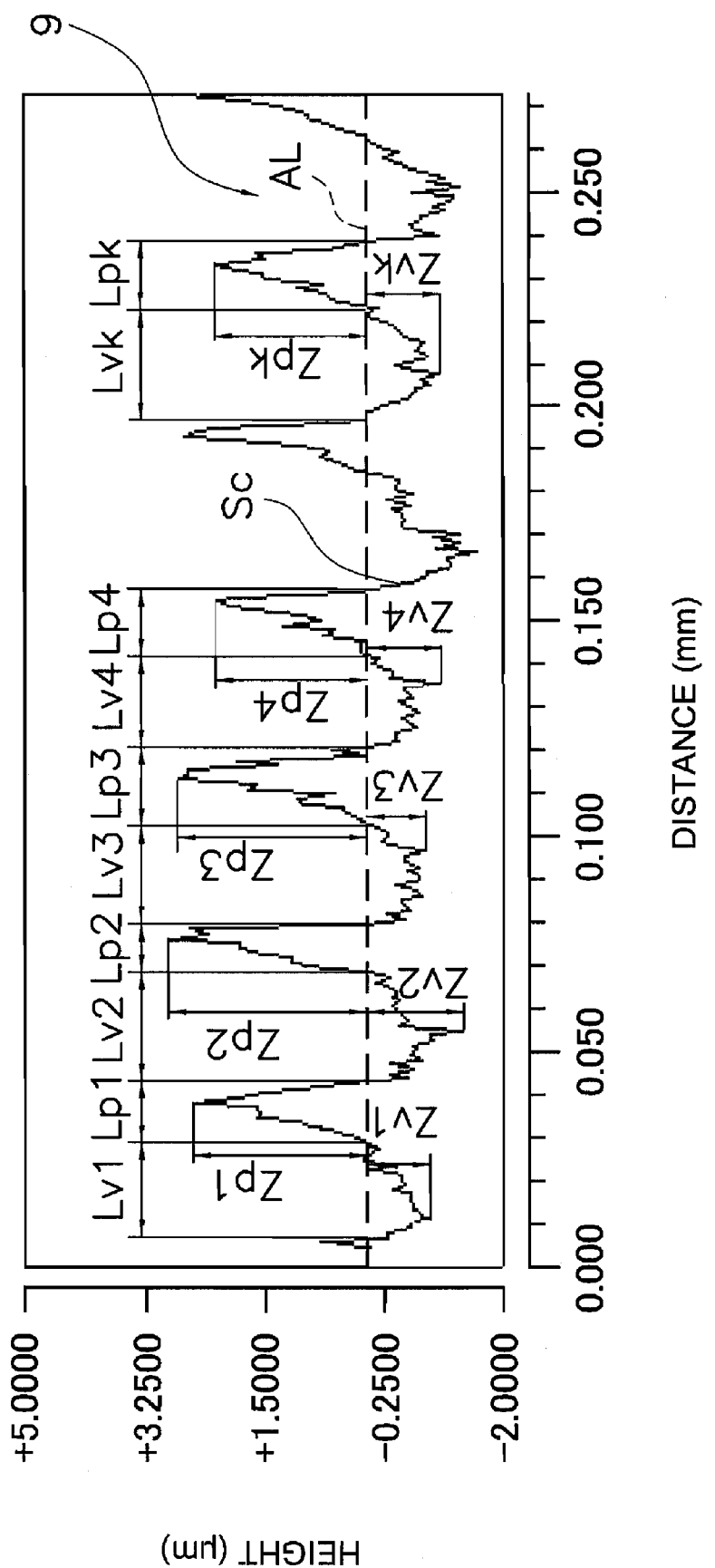
FIG. 4 is a diagram showing the cross-sectional shape of the disk-carrying surface of a spindle motor according to one embodiment of the present invention.
Figure 5:
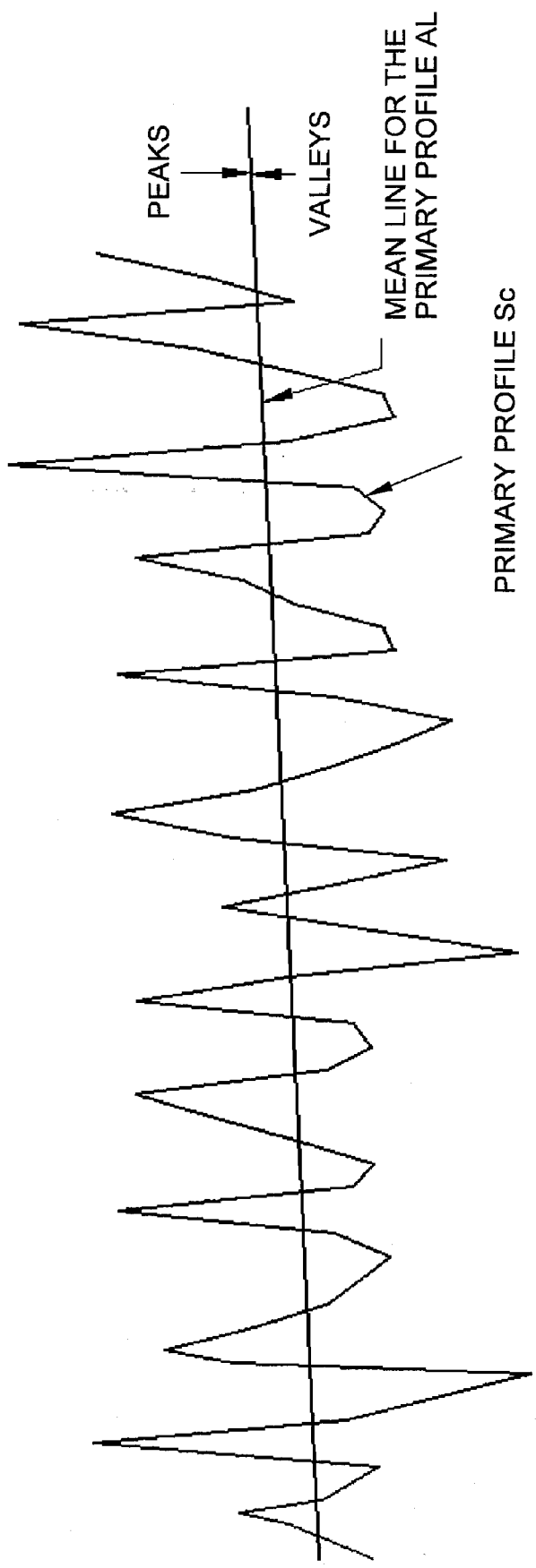
FIG. 5 is a diagram illustrating the definition of the mean line for the primary profile.
Figure 6:
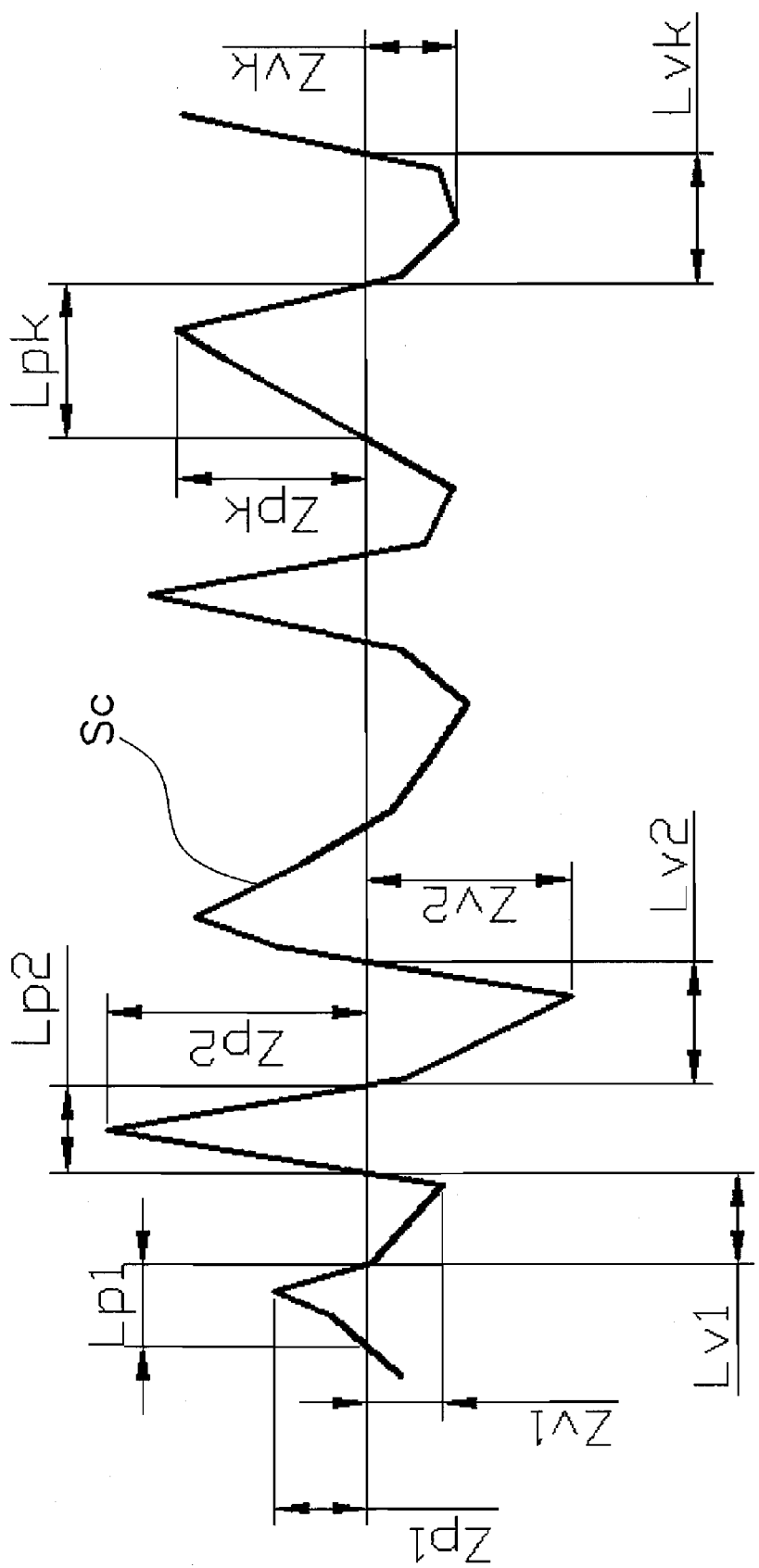
FIG. 6 is a diagram illustrating the definition of the average values of the widths of the profile peaks and profile valleys of the primary profile, the profile peak heights, and the profile valley depths.
Figure 7A:
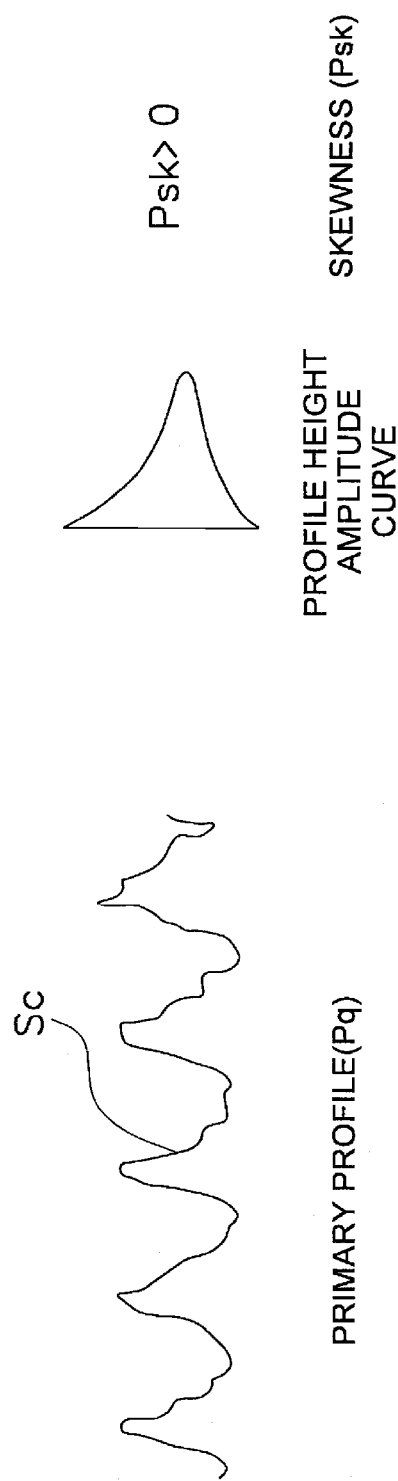
FIG. 7A is a diagram illustrating the definition of the skewness of the primary profile.
Figure 7B:
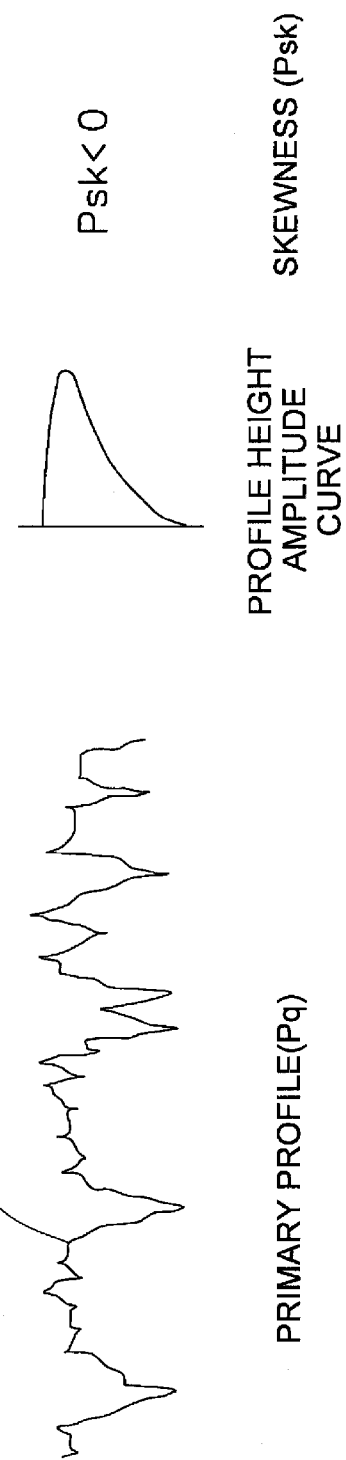
FIG. 7B is a diagram illustrating the definition of the skewness of the primary profile.

In the disk-carrying surface 9, as is shown in FIG. 3, the evaluation length ln (sampling length lp) in the radial direction is a length that is less than 1 mm. Here, the evaluation length ln is the length of the portion that can be viewed as a substantially straight line excluding beveling or the like of the disk-carrying surface 9. As is shown in FIG. 4, the average value of the widths Lpk of the profile peaks in the mean line AL for the primary profile Sc in the radial direction of the disk-carrying surface 9 is smaller than the average value of the widths Lvk of the profile valleys. FIG. 4 shows the primary profile obtained by measurement of the height in the distance along the radial direction of the disk-carrying surface 9 using a light interference type non-contact three-dimensional surface texture measuring apparatus (Model New View 5000 manufactured by Zygo Co.)

In regard to the mean line AL, as was described above, this was calculated by a linear approximation using the method of least squares in the range where the primary profile Sc of the disk-carrying surface 9 in the radial direction was itself taken as the evaluation length ln (sampling length lp).

As is shown in FIG. 4, the average value Lpave of the widths Lp1, Lp2, . . . , Lpk of the profile peaks in the mean line AL indicated by a dotted line is smaller than the average value Lvave of the widths Lv1, Lv2, . . . , Lvk of the widths of the profile valleys. Preferably, furthermore, the average value Lvave of the widths of the profile valleys is 1.5 to 3 times the average value Lpave of the widths of the profile peaks. Furthermore, the average value Zpave of the heights Zp1, Zp2, . . . , Zpk of the profile peaks is 1.5 to 3 times the average value Zvave of the depths Zv1, Zv2, . . . , Zvk of the profile valleys.

When the average value Lvave of the widths Lv1, Lv2, . . . , Lvk of the profile valleys is greater than 3 times the average value Lpave of the widths Lp1, Lp2, . . . , Lpk of the profile peaks, the widths of the profile peaks become excessively narrow, and deformation tends to occur in a plastic region when deformation is caused to take place by pressing by the disk 13. When the average value Zpave of the heights Zp1, Zp2, . . . , Zpk of the profile peaks is greater than 3 times the average value Zvave of the depths Zv1, Zv2, . . . , Zvk of the profile valleys, the widths of the profile peaks likewise become excessively narrow, and deformation tends to occur in a plastic region when deformation is caused to take place by pressing of the disk 13. When the profile peaks reach a state in which plastic deformation occurs, this means that the stress between the disk and the profile peaks becomes excessively large; accordingly, the disk is also susceptible to a large deformation; accordingly, it is not desirable that Lvave be too much greater than Lpave.

Furthermore, the skewness Psk of the primary profile Sc is greater than 0, and is preferably greater than 0.5. The arithmetical mean deviation Pa is 0.5 µm to 1.5 µm. More preferably, the arithmetical mean deviation Pa is 0.6 µm to 1.0 µm. As the value of the skewness Psk becomes larger on the positive side, the profile height amplitude curve is biased toward the profile valley side, the widths of the profile peaks become narrower, and the profile peaks become sharper.

Furthermore, since the arithmetical mean deviation Pa is large, the size of the profile peaks is large, and even if the deformation of the profile peaks is large, this deformation can be suppressed to the elastic deformation region. Accordingly, even if there is a waviness or slope in the disk-carrying surface 9, this is smaller than the profile peak heights, and if the profile peaks are sharp, the profile peaks undergo elastic deformation and escape, so that there is little effect on the disk 13. Even if deformation should partially enter the elastic deformation region, only this portion is deformed, and on the whole, smoothing occurs. Accordingly, problems tend not to occur.

The disk-carrying surface 9 is formed by turning using a tool bit, and the interval of the profile peaks of the cutting trace of the disk-carrying surface 9 caused by turning in the radial direction is 0.02 mm to 0.08 mm as shown in FIG. 4. Here, if the interval of the profile peaks drops below 0.02 mm, the stable formation of profile peaks with a narrow width becomes difficult, and if this interval exceeds 0.08 mm, the number of profile peaks used to support the disk 13 becomes conspicuously smaller for the ordinary length in the radial direction; consequently, the profile peaks of the disk-carrying surface 9 undergo plastic deformation as a result of the attachment and fastening of the disk 13, and deformation is therefore conversely more difficult to suppress. Accordingly, it is desirable that the number of profile peaks on the disk-carrying surface 9 be 5 or more profile peaks.

For example, as is shown in FIGS. 1 and 2, the clamper 10 is a metal dish-form member with spring properties which is made of stainless steel such as SUS303, SUS304, or the like. The tip end of the outer peripheral part 10a is bent downward in the axial direction so as to be able to press the inner peripheral part of the disk 13. The central part of the clamper 10 is also bent downward in the axial direction and is concave overall. A through-hole 10b through which a screw member 26 passes is formed here. The through-hole 10b is disposed facing a female screws hole 7b in the shaft 7.

The base 21 is formed from magnetic stainless steel, and in some cases is formed with a plating of a ferric material. In the case of a large disk size, the base is formed from a non-magnetic aluminum alloy. In this embodiment, the plate part 21a forming the part on the static side of the hydrodynamic bearing device 25 is fastened to the undersurface of the sleeve 22 in the axial direction by appropriate fastening means such as press-fitting, caulking, adhesive bonding, or the like.

The sleeve 22 is fit over the shaft 7 and thrust flange 7a in a state that allows relative rotation. Furthermore, a thrust hydrodynamic groove (not shown in the drawings) forming the hydrodynamic bearing device 25 that generates a hydrodynamic is formed on the facing surfaces in the axial direction of the sleeve 22 and plate 21a in the thrust flange 7a, and a thrust hydrodynamic portion is formed between the thrust flange 7a and the sleeve 22 and plate 21a. Similarly, a radial hydrodynamic groove (not shown in the drawings) forming the hydrodynamic bearing device 25 that generates a hydrodynamic is formed on the facing surfaces of the shaft 7 and sleeve 22 in the radial direction, and a radial hydrodynamic portion is formed between the shaft 7 and sleeve 22. Furthermore, the sleeve 22 is formed from a copper alloy such as brass or the like, and the surface is covered with an electroless nickel plating.

The magnet 23 is held on the outer peripheral part of the magnet attachment part 8b of the rotor hub 8. The magnet 23 is disposed so that the N and S poles are alternately different in the peripheral direction.

The coil 24 is disposed facing the magnet 23 on the outer peripheral side of the magnet 23. The coils 24 are wound around a stator core 27. The stator core 27 has a plurality of protruding pole parts 27a which are disposed at intervals in the peripheral direction with respect to the magnet 23, and which protrude inward in the radial direction; the coil 24 is wound on the protruding pole parts 27a.

EXAMPLES

In the present example, the performance of the spindle motor 20 having the abovementioned disk-carrying surface 9 was compared with the performance of a conventional spindle motor. The results will be described with reference to FIGS. 8 through 16.

As a conventional example, the tool bit was moved at a feed rate of 0.007 mm/rev in the radial direction during turning of the disk-carrying surface, i.e., the tool bit was moved in the radial direction at a feed rate of 0.007 mm per revolution of the rotor hub.

Meanwhile, in the present embodiment, the tool bit was moved at a feed rate of 0.04 mm per revolution of the rotor hub, i.e., a rough finishing feed rate that was about an order of magnitude faster.

Figure 8:
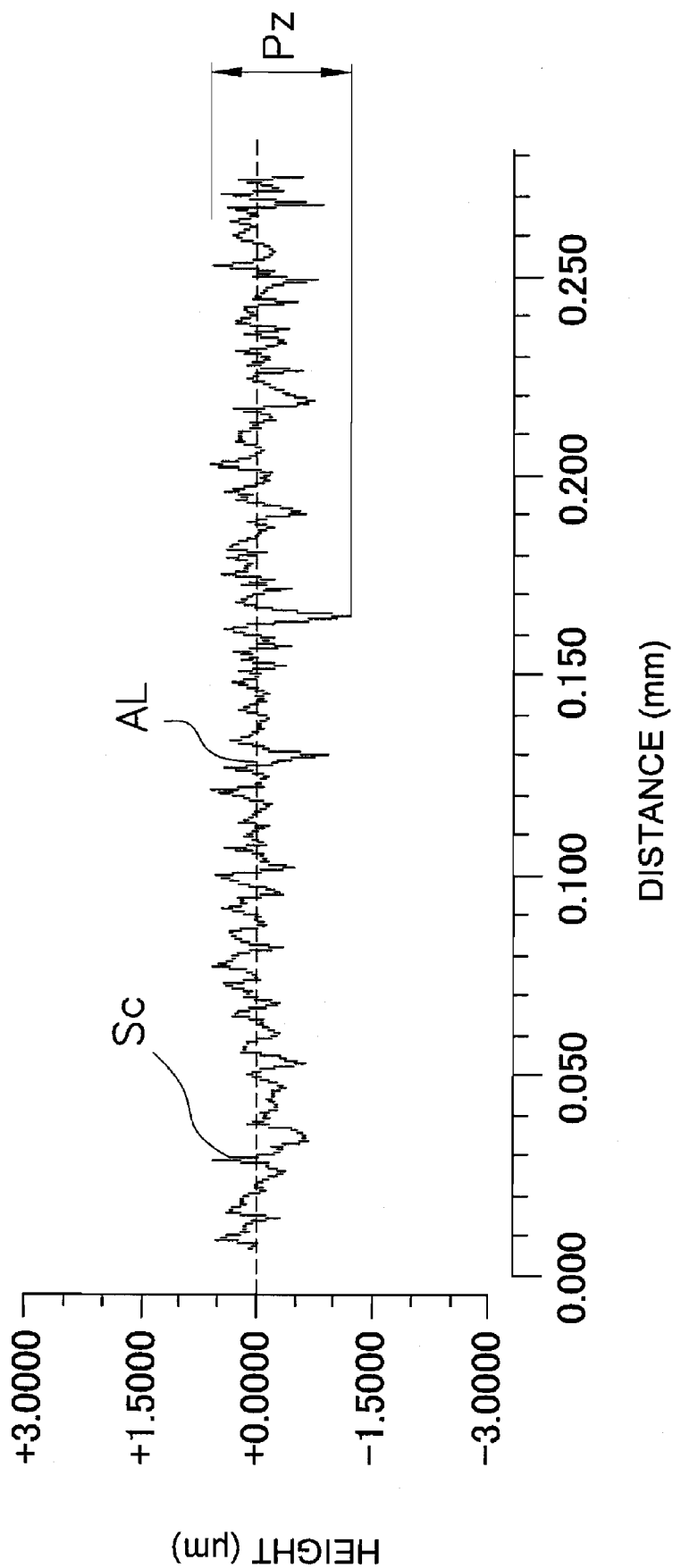
FIG. 8 is a diagram showing the cross-sectional shape of the disk-carrying surface of a conventional example of a spindle motor.

As a result, in the conventional example, a primary profile Sc such as that shown in FIG. 8 was obtained, and the skewness Psk ranged from −0.68 to −0.44. Consequently, it is seen that the average value of the widths of the profile valleys is smaller than the average value of the widths of the profile peaks in the mean line AL for the primary profile Sc of the disk-carrying surface. Furthermore, the root mean square deviation Pq was 0.22 to 0.26, and the arithmetical mean deviation was about 0.15 to 0.2 μm. The maximum height Pz of the primary profile Sc was 1.8 to 1.9 μm. Here, the root mean square deviation Pq of the primary profile Sc is expressed by the following equation.

$$Pq = \sqrt{\frac{1}{lp}\int_0^{lp} Z^2(x)dx}$$

Figure 9:
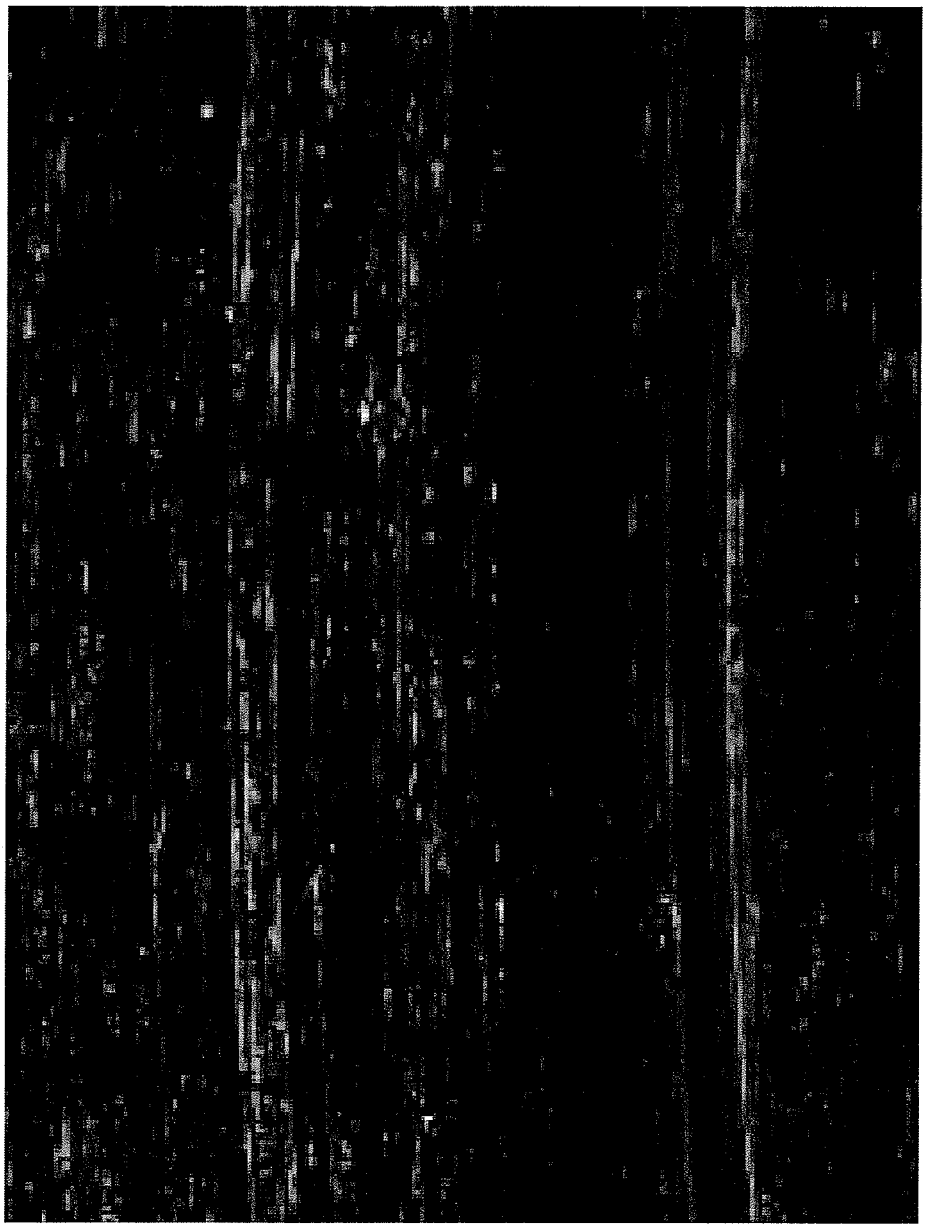
FIG. 9 is a micrograph of the disk-carrying surface in a conventional example.
Figure 11:
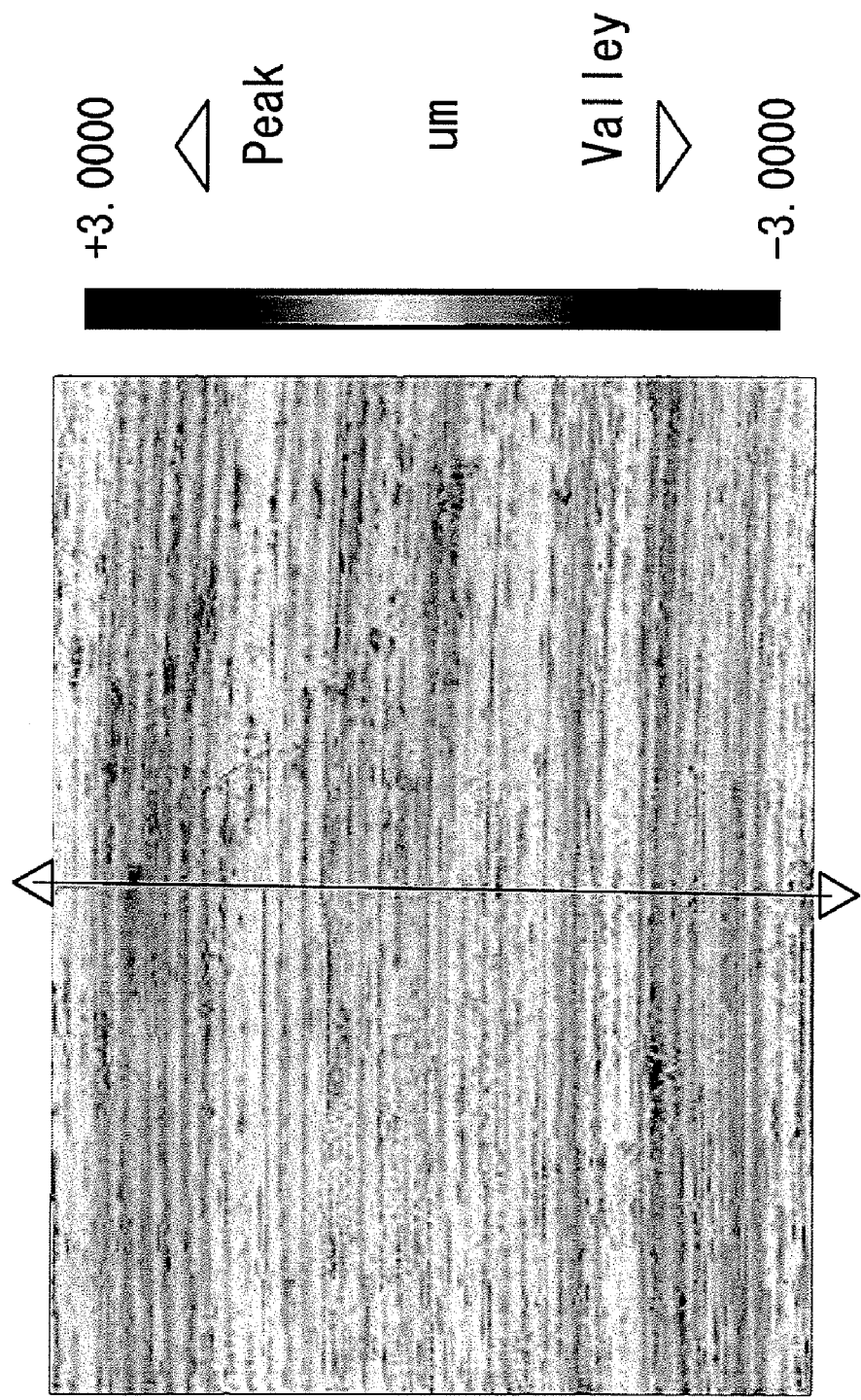
FIG. 11 is a diagram showing the results of three-dimensional measurement of the surface texture of the disk-carrying surface in a conventional example.

A micrograph of the disk-carrying surface of the conventional example is shown in FIG. 9, and the surface conditions of the conventional example measured by a light interference type non-contact three-dimensional surface texture measuring apparatus (Model New View 5000 manufactured by Zygo Co.) are shown in FIG. 11.

It is seen from the micrograph and the image of the light interference non-contact three-dimensional surface texture measuring apparatus, and also from the abovementioned four parameters in the height direction, that the profile peak heights of the disk-carrying surface is low in the conventional example, that the difference between the profile peak heights and the profile valley depths is small, the irregularity is gradual, and the disk-carrying surface is finished to a smooth surface.

On the other hand, the primary profile Sc of the disk-carrying surface 9 in the present embodiment is a curve of the type shown in the abovementioned FIG. 4; and the skewness Psk ranged from 1.0 to 1.05. As a result, it is seen that the average value of the widths of the profile peaks is smaller than the average value of the widths of the profile valleys in the mean line for the primary profile Sc of the disk-carrying surface 9. Furthermore, the root mean square deviation Pq was 0.97 to 1.0, the arithmetical mean deviation was about 0.7 to 0.8 μm, and the maximum height Pz of the primary profile Sc was 4.4 to 4.5 μm.

Figure 10:
FIG. 10 is a micrograph of the disk-carrying surface in the present embodiment.
Figure 12:
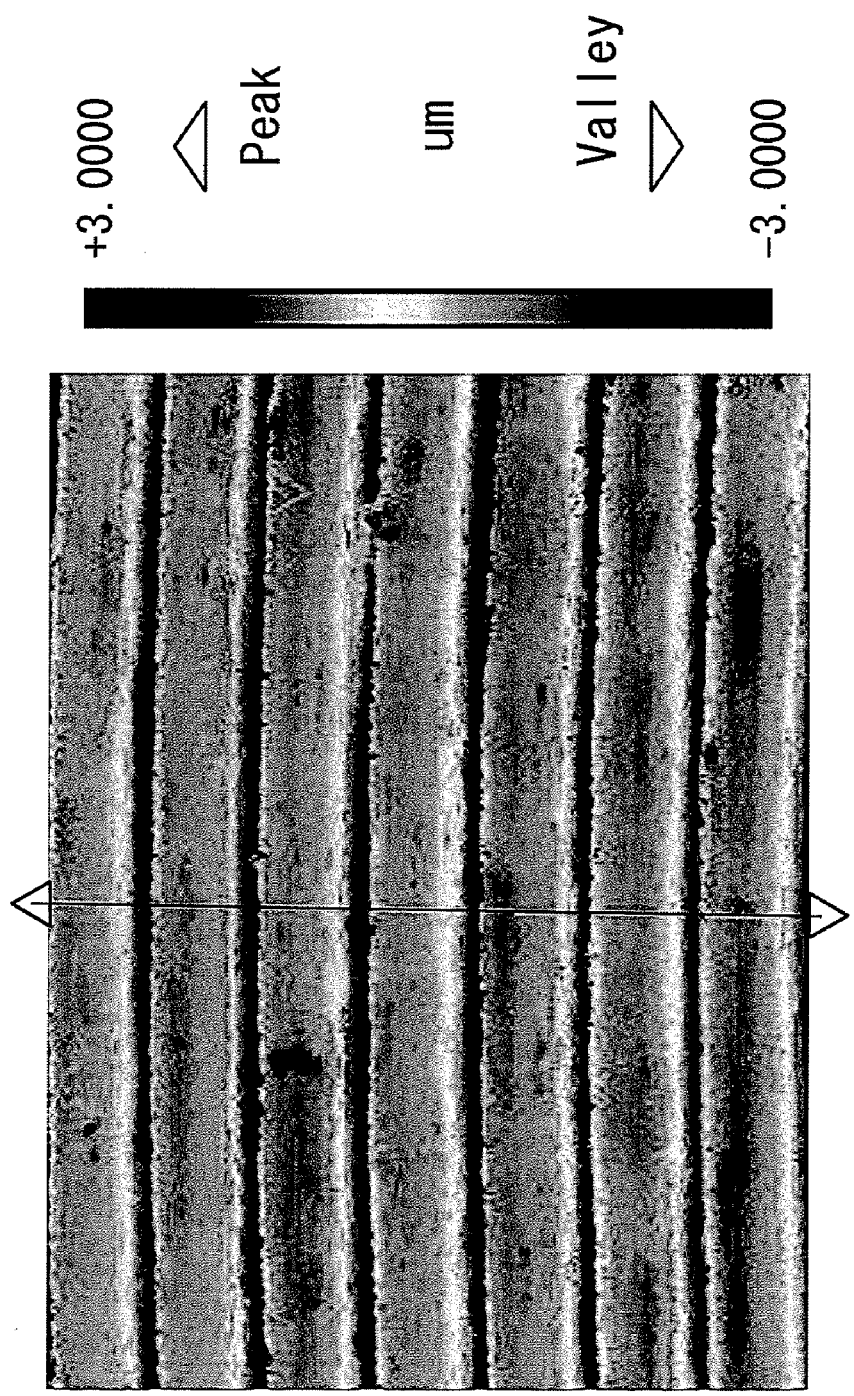
FIG. 12 is a diagram showing the results of three-dimensional measurement of the surface texture of the disk-carrying surface in the present embodiment.

A micrograph of the disk-carrying surface 9 of the embodiment is shown in FIG. 10, and the surface conditions of the conventional example measured by the light interference non-contact three-dimensional surface texture measuring apparatus are shown in FIG. 12.

It is seen from the micrograph and the image of the light interference non-contact three-dimensional surface texture measuring apparatus, and also from the abovementioned four parameters in the height direction, that the profile peak heights that are the kerf of the turning trace of the tool bit are high, and that the difference between the profile peak heights and the profile valley depths is large, and the irregularity is evident and large, in the present embodiment.

Figure 13A:
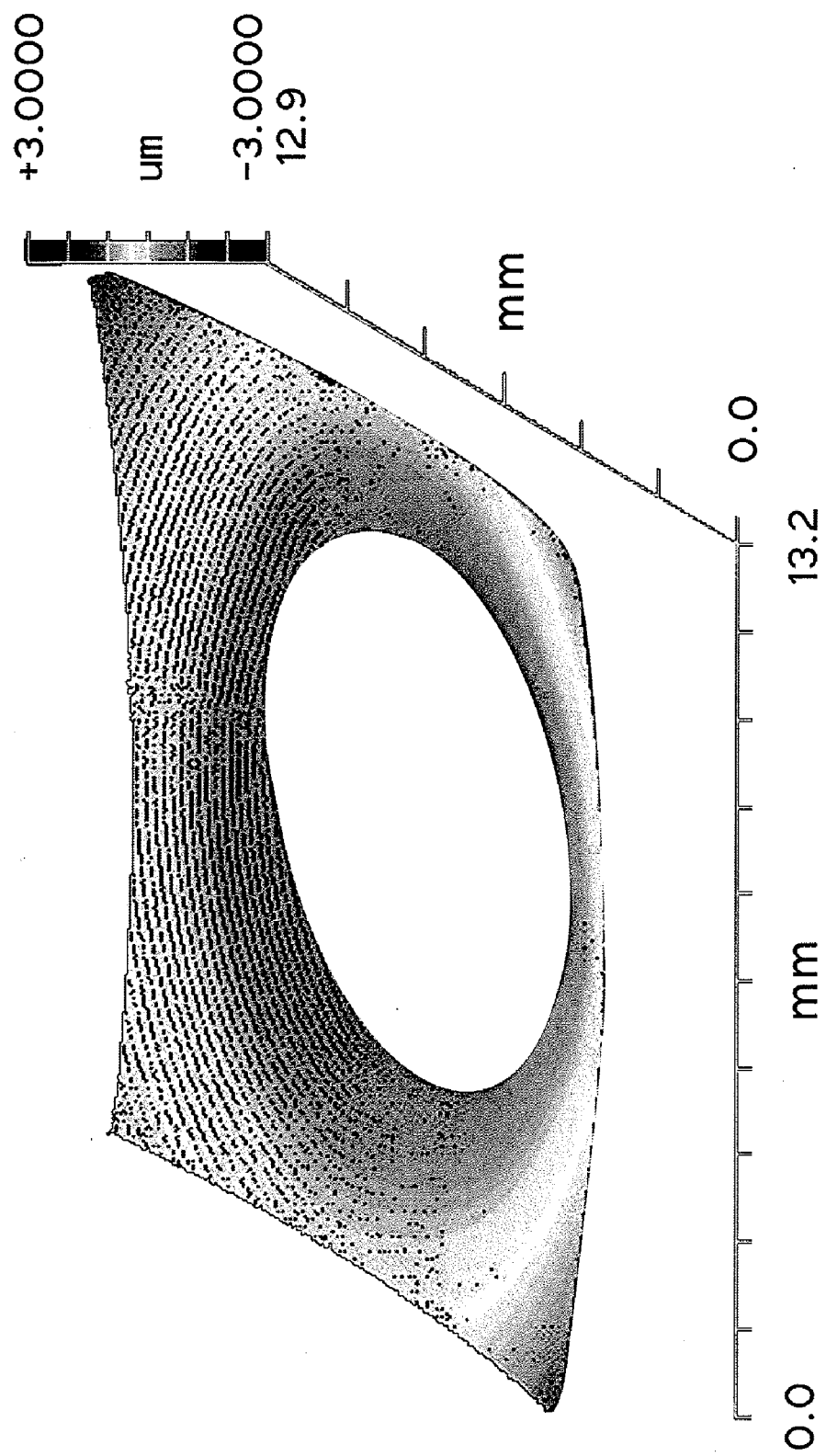
FIG. 13A is a diagram showing the results of three-dimensional measurement of the conditions of deformation of a disk carried on the disk-carrying surface in a conventional example (INITIAL STAGE)
Figure 13B:
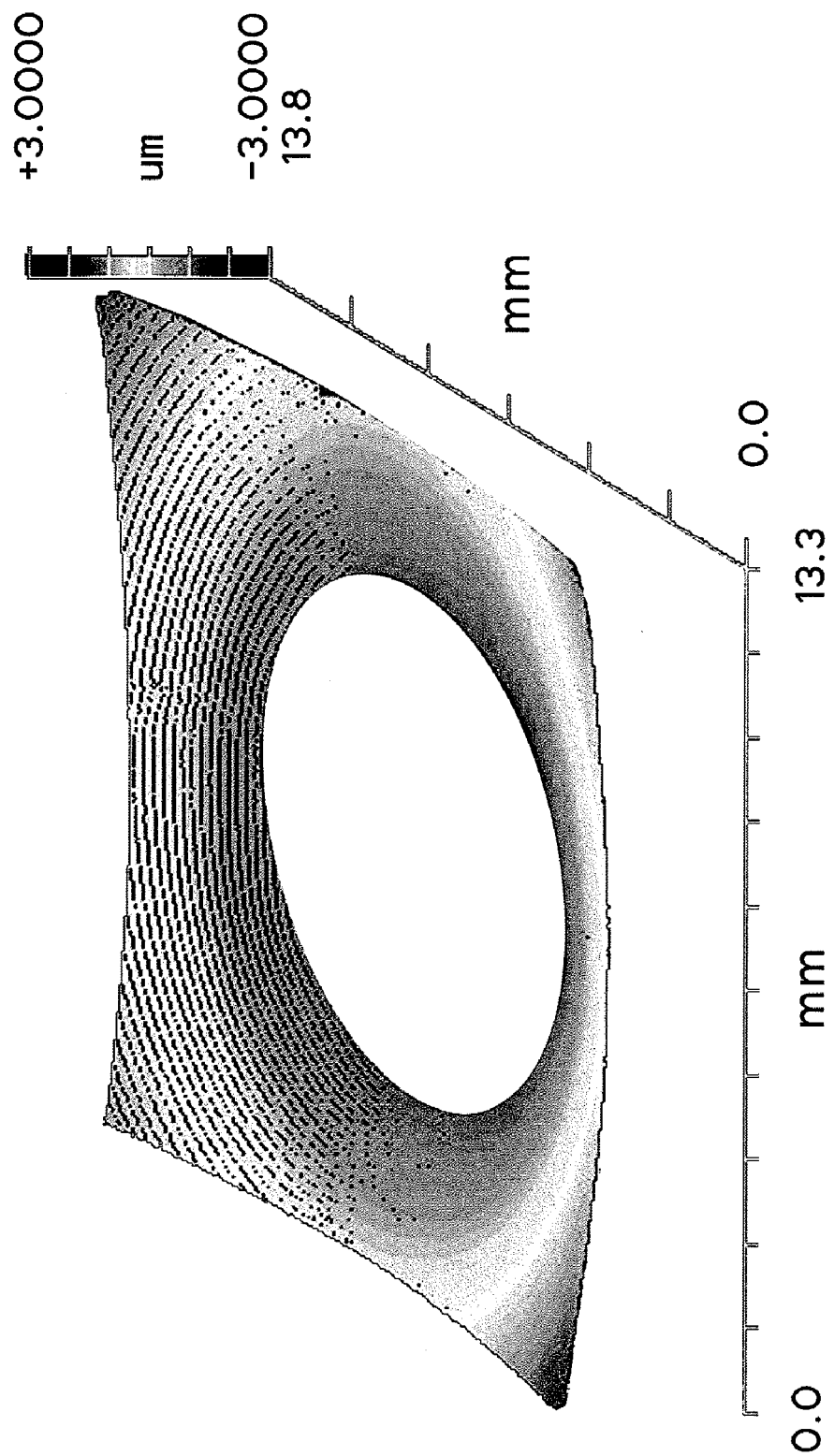
FIG. 13B is a diagram showing the results of three-dimensional measurement of the conditions of deformation of a disk carried on the disk-carrying surface in a conventional example (ROTATION OF CLAMPER BY 90°)
Figure 13C:
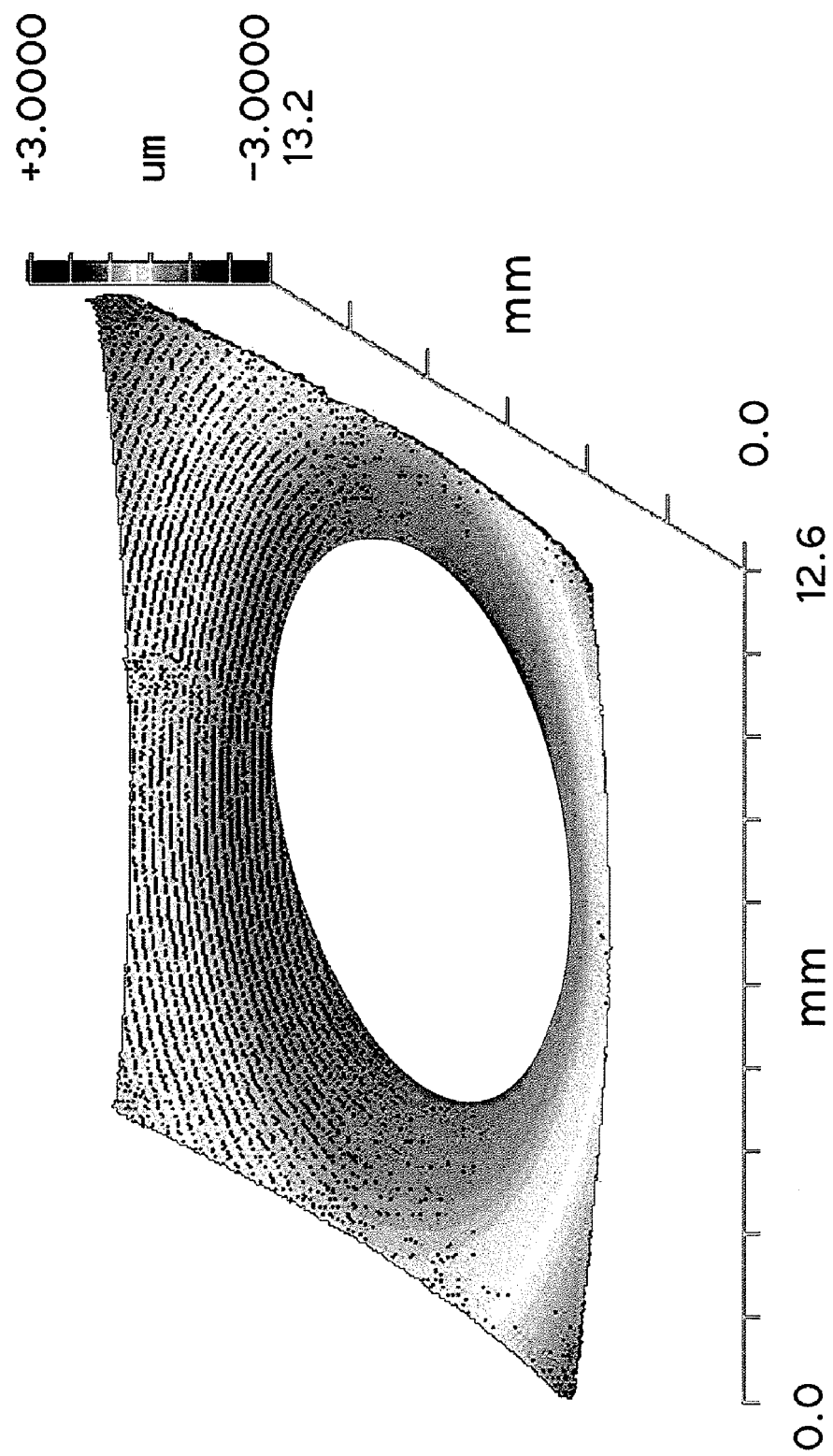
FIG. 13C is a diagram showing the results of three-dimensional measurement of the conditions of deformation of a disk carried on the disk-carrying surface in a conventional example (REPLACEMENT OF CLAMPER)
Figure 13D:
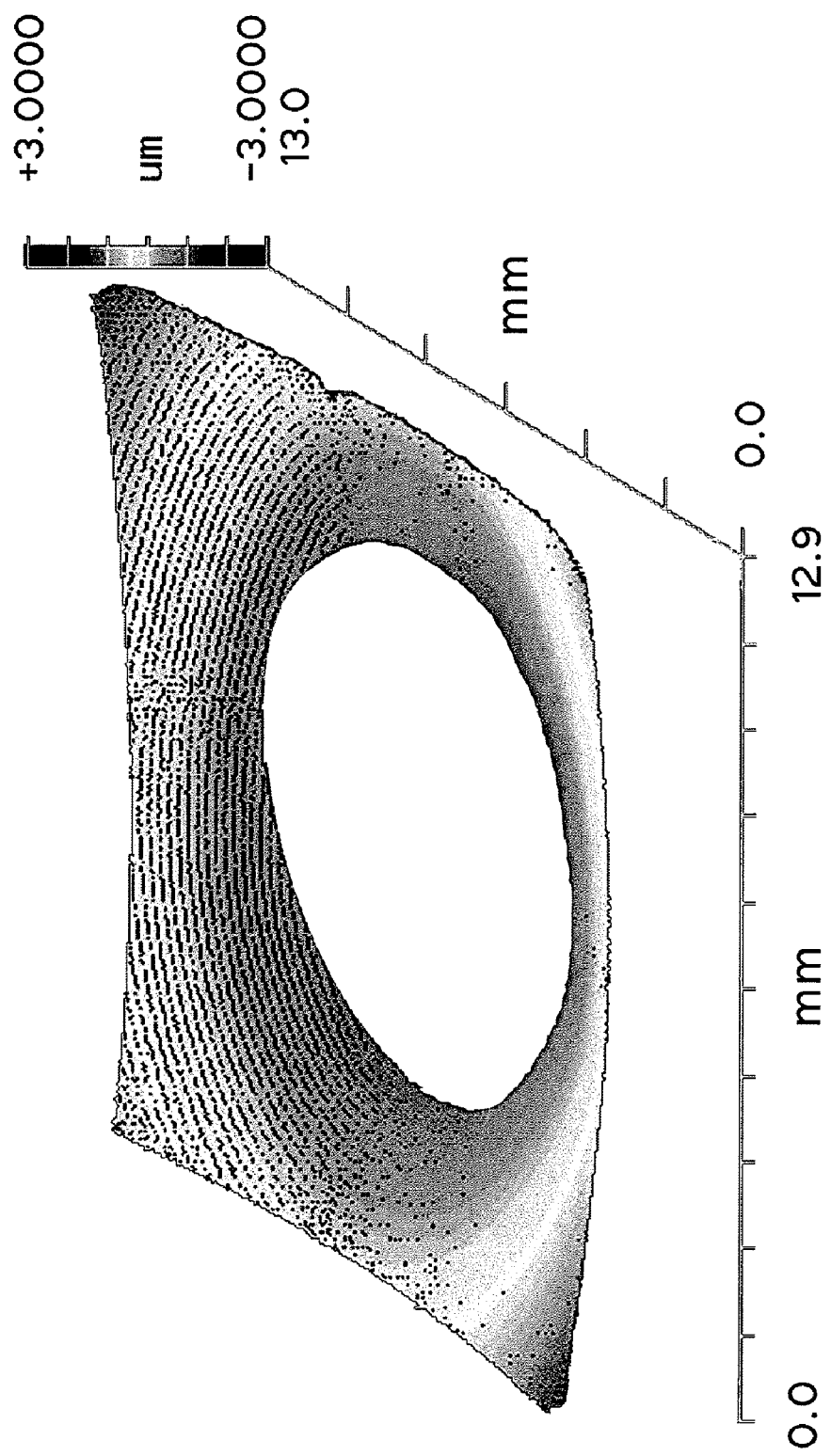
FIG. 13D is a diagram showing the results of three-dimensional measurement of the conditions of deformation of a disk carried on the disk-carrying surface in a conventional example (REPLACEMENT OF DISK)
Figure 14A:
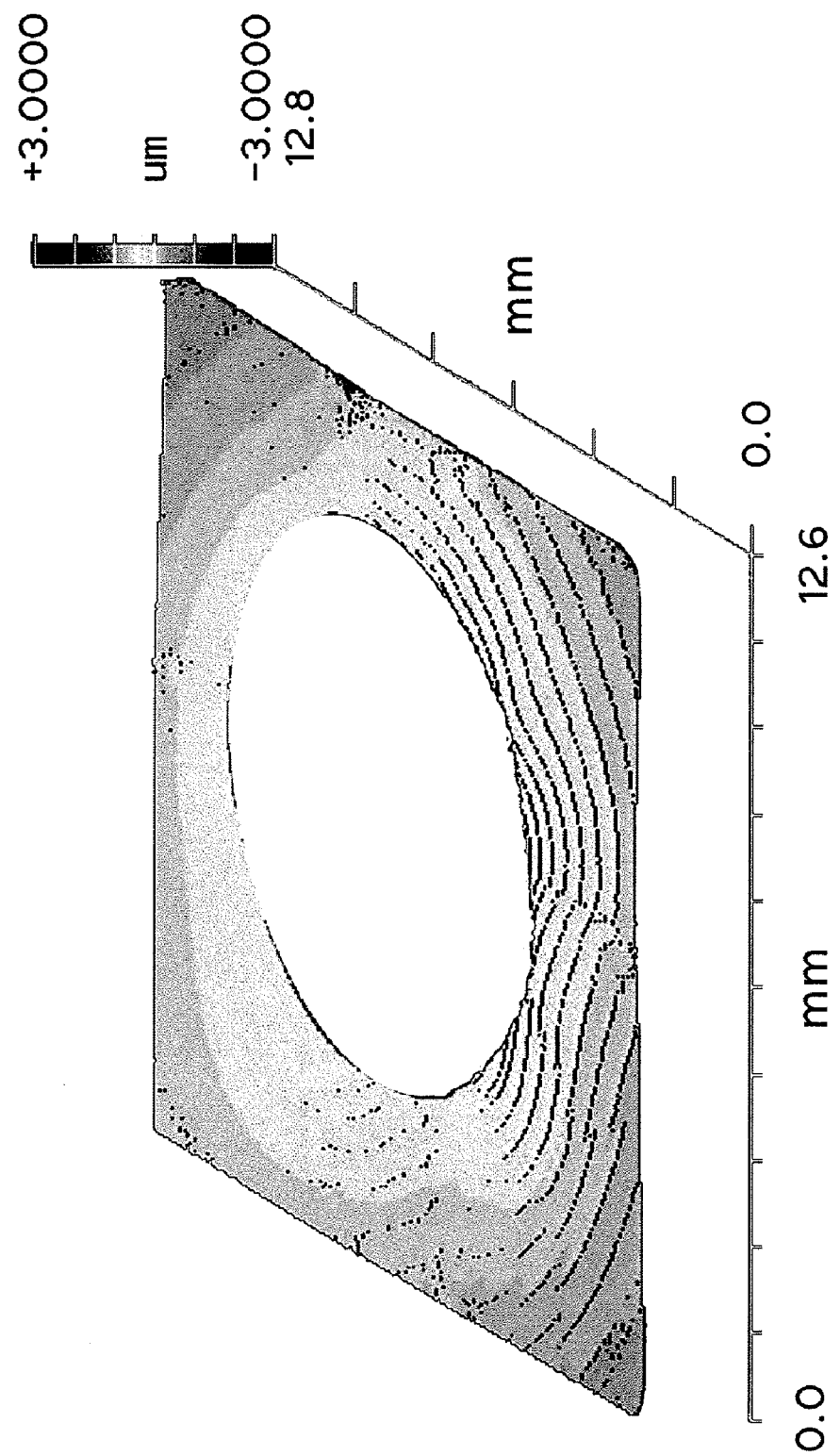
FIG. 14A is a diagram showing the results of three-dimensional measurement of the conditions of deformation of a disk carried on the disk-carrying surface in the present embodiment (INITIAL STAGE)
Figure 14B:
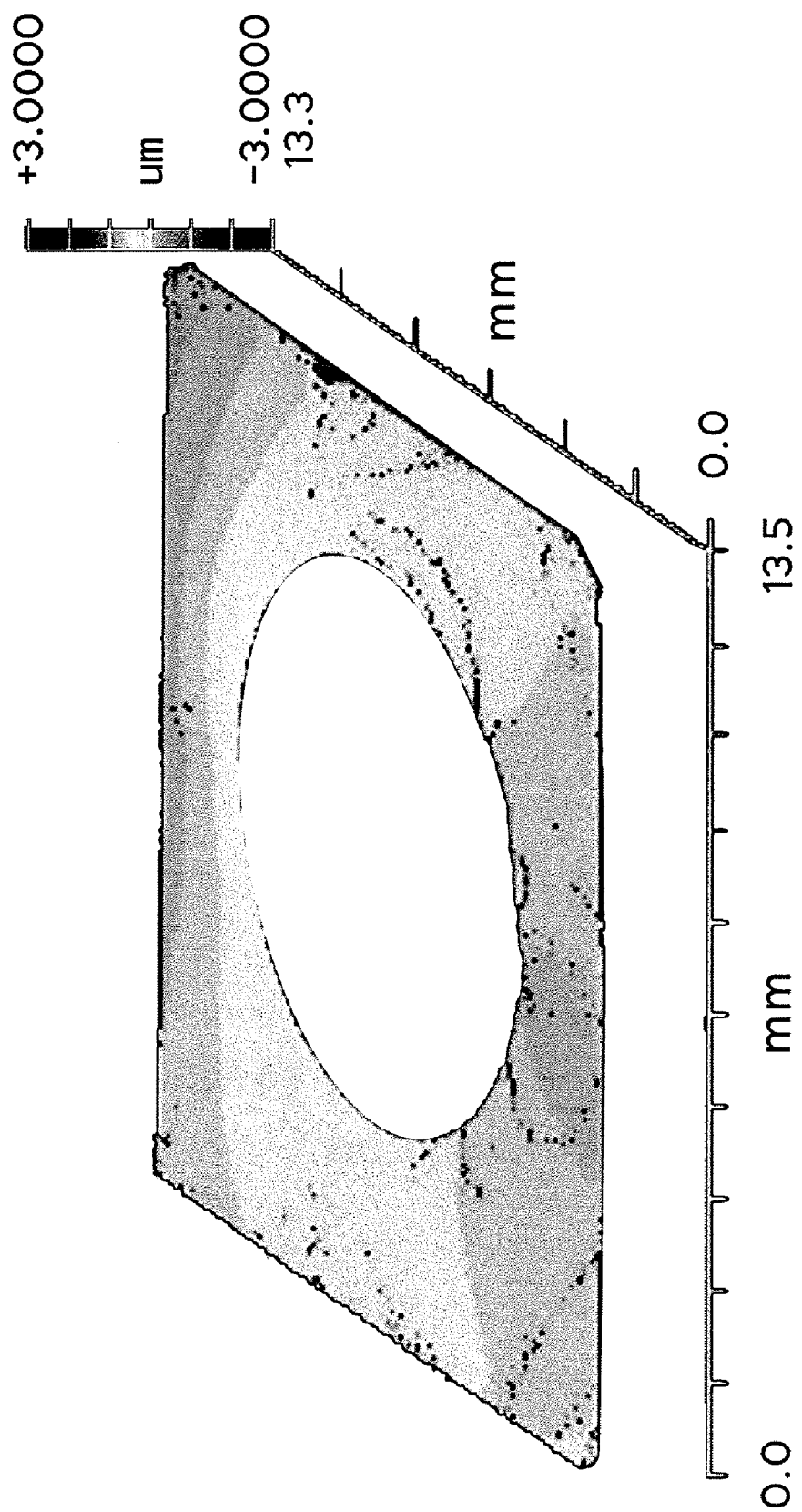
FIG. 14B is a diagram showing the results of three-dimensional measurement of the conditions of deformation of a disk carried on the disk-carrying surface in the present embodiment (ROTATION OF CLAMPER BY 90°)
Figure 14C:
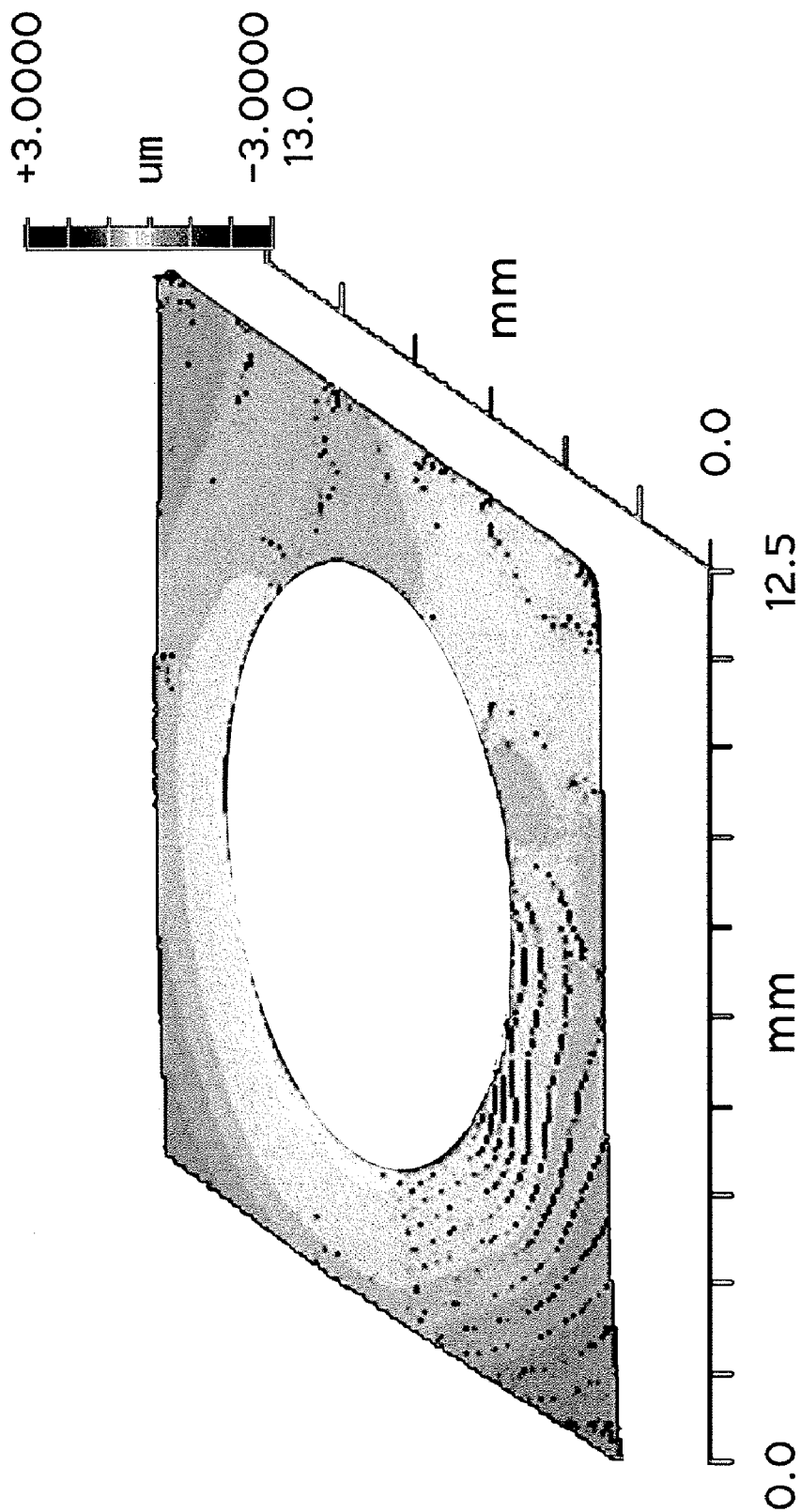
FIG. 14C is a diagram showing the results of three-dimensional measurement of the conditions of deformation of a disk carried on the disk-carrying surface in the present embodiment (REPLACEMENT OF CLAMPER)
Figure 14D:
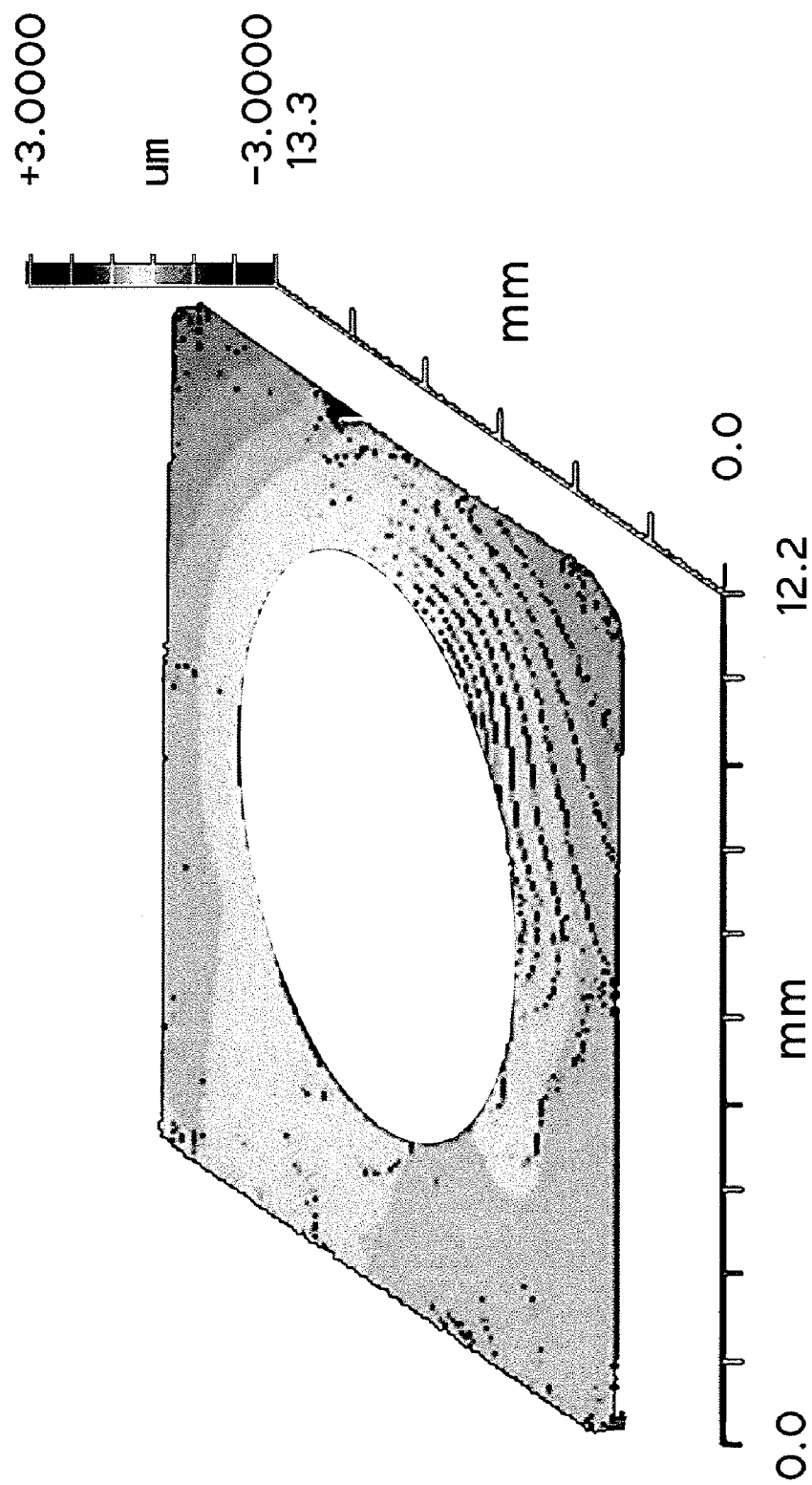
FIG. 14D is a diagram showing the results of three-dimensional measurement of the conditions of deformation of a disk carried on the disk-carrying surface in the present embodiment (REPLACEMENT OF DISK)
Figure 15:
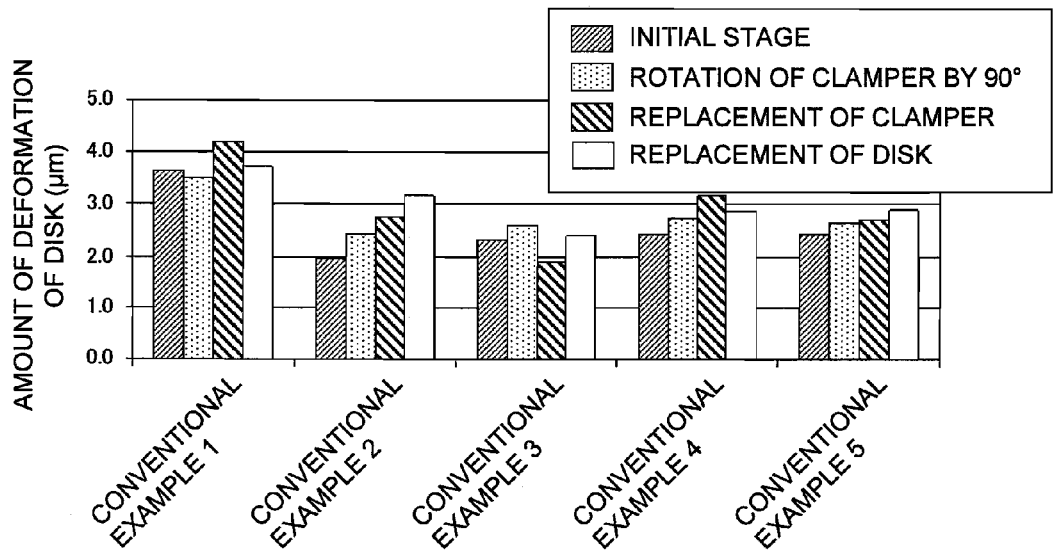
FIG. 15 is a graph showing the conditions of deformation of a conventional example of a disk in numerical values.
Figure 16:
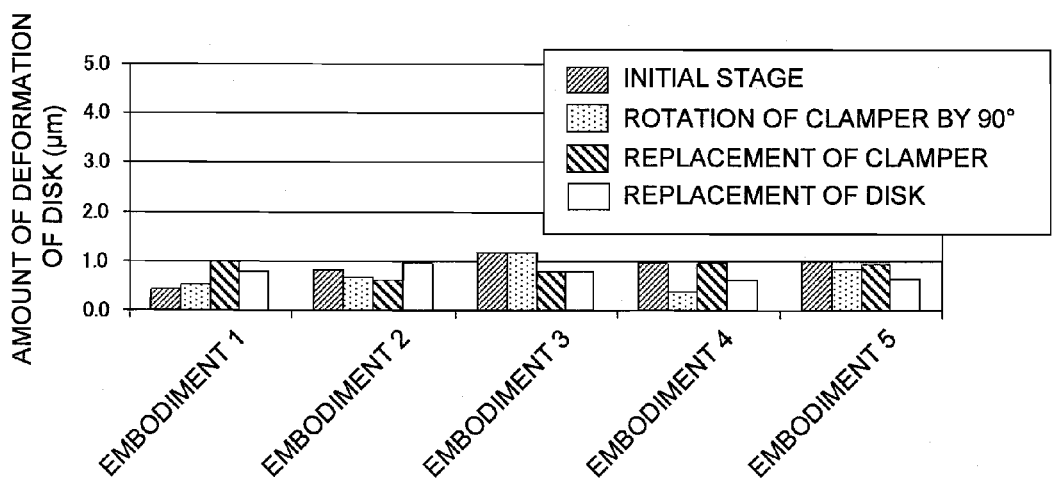
FIG. 16 is a graph showing the conditions of deformation of the disk of the present embodiment in numerical values.

Furthermore, the measurement results of the surface conditions in the light interference non-contact three-dimensional surface texture measurement apparatus in cases where a disk was actually mounted are shown for the conventional example and the present embodiment in FIGS. 13A, 13B, 13C, 13D, 14A, 14B, 14C and 14D. Moreover, a plotted conversion of the results into numerical values is shown in graphs in FIGS. 15 and 16. In addition, FIGS. 13A, 13B, 13C, 13D and 15 show a case in which a disk was mounted on the disk-carrying surface of the conventional example, and FIGS. 14A, 14B, 14C, 14D and 16 show a case in which a disk was mounted on the disk-carrying surface of the embodiment. Furthermore, FIGS. 13A and 14A shows images measured in the initial phase state of the clamper when the medium was mounted, and FIGS. 13B and 14B shows images measured in a state in which the clamper was rotated 90 degrees from the initial phase. FIGS. 13C and 14C shows images measured in a state in which the clamper was replaced with another clamper. FIGS. 13D and 14D shows images measured in a state in which the disk was replaced with another disk. Furthermore, FIGS. 15 and 16 show graphs indicating numerical values of the test results for 5 samples of the conventional example and embodiment.

In this embodiment, the disk is a 1 inch glass disk, and the thickness is 0.38 mm.

It is seen from the abovementioned measurement results that when a disk is mounted on the disk-carrying surface of the conventional example and clamped by the clamper, a disk deformation of about 3 μm is seen in all cases. The disk-carrying surface appears to be worked more flatly in the conventional example than in the embodiment; however, the variation in the deformation of the disk is large. This is thought to be due to the following: in the conventional example, the feed rate used to finish the disk-carrying surface by turning is slow, so that the disk-carrying surface is flattened; consequently, the number of profile peaks is increased, and the strength of the profile peaks is high, so that elastic deformation tends not to occur. Accordingly, the difference in the profile peak heights leads to deformation of the disk.

Furthermore, even if the feed rate should increase, and the number of profile peaks is reduced, elastic deformation of the profile peaks is not expected in cases where the skewness is negative, or cases where the width of the profile valleys is smaller than the width of the profile peaks. Accordingly, deformation of the disk cannot be suppressed.

However, in the embodiment, in all cases, in spite of the phase and replacement of the clamper and the replacement of the disk, the deformation of the disk is kept to 1 μm or less. The reason for this is that since the widths of the profile peaks are narrow, the profile peaks are caused to undergo elastic deformation along the disk by the disk that is pressed by the clamper.

[Special Features of Spindle Motor 20]

(1)

In the spindle motor 20 of the present embodiment, as is shown in FIG. 4, the skewness Psk of the primary profile Sc of the disk-carrying surface 9 is positive, and the average value Lpave of the widths Lpk of the profile peaks in the mean line AL for the primary profile Sc is smaller than the average value Lvave of the widths Lvk of the profile valleys; accordingly, the profile peaks on the whole have narrower widths than the profile valleys, and fluctuations in the strength of the profile peaks can be suppressed. Accordingly, even if the certain profile peak heights are higher than other profile peak heights, the profile peaks have s small width; accordingly, the profile peaks tend to undergo elastic deformation rather than the disk 13 when the profile peaks are pressed by the disk 13, and the deformation of the disk 13 caused by clamping can be suppressed to a maximum extent. Accordingly, there is no great warping or waviness of the disk 13, and the possibility of head crashing can be greatly reduced. Furthermore, track misregistration (TMR) can be greatly ameliorated.

Moreover, the variation in the disk 13 can be suppressed and the disk can be attached with good precision without greatly improving the working precision, precision of the assembled parts, or the like from those of a conventional system; this contributes to an increase in the recording density of the HDD, and makes it possible to achieve a reduction in cost.

(2)

In the spindle motor 20 of the present embodiment, as is shown in FIG. 4, the average value Zpave of the heights Zpk of the profile peaks in the primary profile Sc of the disk-carrying surface 9 is 1.5 times the average value Zvave of the depths Zvk of the profile valleys or greater.

Since the average value Zpave of the heights Zpk of the profile peaks is 1.5 times the average value Zvave of the depths Zvk or the profile valleys or greater, the heights Zpk of the profile peaks overall are conspicuously greater than the depths Zvk of the profile valleys, the variation in the strength of the profile peaks is further reduced, and the profile peaks readily undergo elastic deformation. Accordingly, the deformation of the disk can be further suppressed.

(3)

In the spindle motor 20 of the present embodiment, as is shown in FIG. 4, the arithmetical mean deviation Pa of the primary profile Sc of the disk-carrying surface 9 is in the range of 0.5 µm to 1.5 µm.

As a result, the size of the profile peaks is large, and even if the deformation of the profile peaks is large, this deformation can be suppressed to a value in the elastic deformation region. Accordingly, even if there is a waviness or slope in the disk-carrying surface 9, the effect on the disk 13 is small. Even if deformation should partially enter the plastic deformation region, only this part is deformed; on the whole, smoothing occurs, so that no problems arise.

(4)

In the spindle motor 20 of the present embodiment, as is shown in FIG. 4, the interval of the profile peaks in the radial direction of the disk-carrying surface 9 resulting from turning is in the range of 0.02 mm to 0.08 mm.

Here, the length in the radial direction of a disk-carrying surface 9 mounting a disk 13 that is 2.5 inches or smaller is ordinarily around 1 mm or less. At the same time in the present, profile peaks having a narrow width can be stably formed, and the number of profile peaks can be maximized. Here, if the interval of the profile peaks drops below 0.02 mm, it becomes difficult to form profile peaks having a narrow width in a stable manner, and if the clearance exceeds 0.08 mm, the number of profile peaks used to support the disk 13 is reduced for an ordinary length, and it becomes difficult to suppress deformation of the disk 13.

(5)

In the spindle motor 20 of the present embodiment, the motor can also be used for a disk 13 having a substrate other than glass. The reason for this is that the side of the disk-carrying surface 9 is caused to undergo elastic deformation as a result of the fact that the cross-sectional shape of the disk-carrying surface 9 has a narrow profile peak shape, and deformation on the side of the disk 13 tends not to occur. Accordingly, a relatively light-weight and soft aluminum substrate or synthetic resin substrate can be used for the disk 13. From this standpoint as well, a reduction in the cost of the recording and reproducing apparatus can be achieved.

Other Embodiments

One embodiment of the present invention was described above. However, the present invention is not limited to the abovementioned embodiment; various alterations are possible within a range that involves no departure from the main point of the invention.

(A)

In the abovementioned embodiment, an axial rotary type motor was indicated as an example of the spindle motor. However, the present invention can also be applied to an axially fixed type spindle motor in which the shaft is installed in an upright position on the base. In this case, a sleeve that is disposed on the outer peripheral side of the shaft rotates, and a rotor is connected to this sleeve. Furthermore, the clamper is fastened to the rotor hub.

(B)

In the abovementioned embodiment, an example was described in which the spindle motor 20 of the present invention was mounted on an HDD 40 mounting only one disk 13. However, the present invention is not limited to this.

Figure 17:
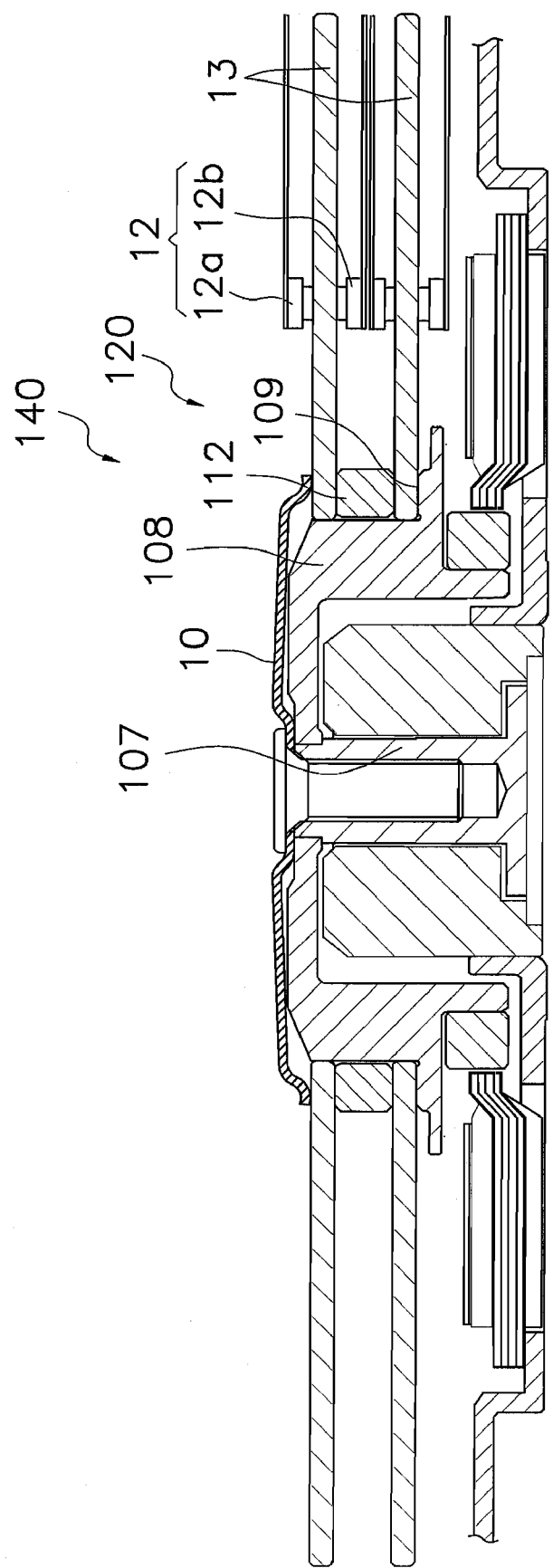
FIG. 17 is a sectional view showing the overall construction of an HDD mounting a spindle motor according to another embodiment of the present invention.

For example, as is shown in FIG. 17, the spindle motor 120 of the present invention can also be used in an HDD (one example of a recording and reproducing apparatus) 140 mounting two or more disks 13 by spacers 112.

In this case, a spindle motor 120 including a shaft 107, rotor hub 108, disk-carrying surface 109, and clamper may be used, and as was described above, the cross-sectional shape of the disk-carrying surface 109 may be formed in the same manner as in the abovementioned embodiment.

In this way, the present invention can also be applied to a recording and reproducing apparatus such as an HDD 140 or the like mounting a plurality of disks.

(C)

In the abovementioned embodiment, the rotor hub was described as being made of stainless steel. However, the present invention is not limited to this. For example, an aluminum alloy or other free-cutting steel or high-strength steel can be used, and furthermore, a surface effect treatment such as electroless NiP plating or the like can be performed in order to (e.g.) make the surface harder, or in order to prevent outgassing.

(D)

In the abovementioned embodiment, the thrust bearing was described as being based on a construction in which a flange was fastened to the tip end of the shaft. However, the present invention is not limited to this. For example, a construction may also be used in which a thrust bearing is constructed between the flat end surface of the tip end of the shaft and a plate without using a flange. Furthermore, a construction may also be used in which the space between the undersurface side of the rotor hub and the upper end side of the sleeve is formed as a minute clearance, and a thrust hydrodynamic groove is disposed here. Moreover, the number of thrust bearings is not limited to one; for example, thrust plates may be disposed one each on the upper and lower open ends as bearings in an axially fixed structure, and a sleeve may be disposed between these. Furthermore, the hydrodynamic bearing device may also be a conical bearing rather than being constructed from a radial bearing and a thrust bearing.

(E)

In the abovementioned embodiment, a so-called inner rotor type motor was described in which a coil was disposed on the outer peripheral side of the magnet. However, the present invention is not limited to this. For example, a so-called outer rotor type may also be used in which a coil is disposed on the inner peripheral side of the magnet.

(F)

In the abovementioned embodiment, an example was described in which the spindle motor 20 of the present invention was applied to an HDD 40. However, the present invention is not limited to this.

For example, the present invention can also naturally be used as a spindle motor mounted on an optical-magnetic disk apparatus, optical disk apparatus, flexible disk apparatus, or the like.

INDUSTRIAL APPLICABILITY

The spindle motor of the present invention has the effect of allowing the suppression of deformation of the disk caused by clamping even in cases where the disk is made thin and compact. Accordingly, the present invention can be widely used as a spindle motor mounted on various types of recording and reproducing apparatuses such as compact HDDs, optical-magnetic disks, optical disks, Floppy (registered trademark) Disks, and the like.

What is claimed is:

1. A spindle motor comprising:
a shaft having an outer peripheral side;
a rotor disposed on said outer peripheral side of said shaft, and configured to rotate about said shaft; and
a medium-carrying surface disposed on said rotor, and configured to carry a circular-disk-form recording medium, said medium-carrying surface includes profile peaks and profile valleys; wherein
a clamping member is configured to press the recording medium toward the medium-carrying surface and fasten the recording medium to the medium-carrying surface; and
an average value of widths of said profile peaks in the mean line for a primary profile of said medium-carrying surface in the radial direction is smaller than an average value of widths of said profile valleys in the mean line.

2. The spindle motor according to claim 1, wherein an average value of heights of said profile peaks is 1.5 times an average value of depths of said profile valleys or greater.

3. The spindle motor according to claim 1, wherein the average value of the widths of said profile valleys is 1.5 times the average value of the widths of the profile peaks or greater.

4. A spindle motor comprising:
a shaft having an outer peripheral side;
a rotor disposed on said outer peripheral side of said shaft, and configured to rotate about said shaft; and
a medium-carrying surface disposed on said rotor, and carrying a circular-disk-form recording medium; wherein
a clamping member is configured to press the recording medium toward said medium-carrying surface and fasten the recording medium to the medium-carrying surface; and
a skewness of a primary profile of said medium-carrying surface in the radial direction is greater than 0.

5. The spindle motor according to claim 4, wherein the skewness is greater than 0.5.

6. The spindle motor according to claim 1, wherein the arithmetical mean deviation of the primary profile is in the range of 0.5 μm to 1.5 μm.

7. The spindle motor according to claim 4, wherein the arithmetical mean deviation of the primary profile is in the range of 0.5 μm to 1.5 μm.

8. The spindle motor according to claim 1, wherein said medium-carrying surface is subjected to turning using a tool bit; and
the radial direction interval of said profile peaks in said medium-carrying surface resulting from turning is in the range of 0.02 mm to 0.08 mm.

9. The spindle motor according to claim 4, wherein said medium-carrying surface is subjected to turning using a tool bit; and
the radial direction interval of said profile peaks in said medium-carrying surface resulting from turning is in the range of 0.02 mm to 0.08 mm.

10. The spindle motor according to claim 1, wherein said spindle motor is a rotating-shaft spindle motor, and wherein said rotor is configured to rotate together with said shaft.

11. The spindle motor according to claim 4, wherein said spindle motor is a rotating-shaft spindle motor, and wherein said rotor is configured to rotate together with said shaft.

12. The spindle motor according to claim 1, wherein said spindle motor is a stationary-shaft spindle motor, and wherein said shaft does not rotate.

13. The spindle motor according to claim 4, wherein said spindle motor is a stationary-shaft spindle motor, and wherein said shaft does not rotate.

14. A recording and reproducing apparatus comprising:
said spindle motor according to claim 1; and
a head part configured to perform recording and reproduction on the recording medium carried on said medium-carrying surface.

15. A recording and reproducing apparatus comprising:
said spindle motor according to claim 4; and
a head part configured to perform recording and reproduction on the recording medium carried on said medium-carrying surface.

* * * * *